US007907513B2

(12) United States Patent
Proctor, Jr. et al.

(10) Patent No.: US 7,907,513 B2
(45) Date of Patent: Mar. 15, 2011

(54) SUPERIMPOSED COMPOSITE CHANNEL FILTER

(75) Inventors: James A. Proctor, Jr., Melbourne Beach, FL (US); Kenneth M. Gainey, Satellite Beach, FL (US); James C. Otto, West Melbourne, FL (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 12/041,626

(22) Filed: Mar. 3, 2008

(65) Prior Publication Data

US 2008/0232241 A1 Sep. 25, 2008

Related U.S. Application Data

(60) Provisional application No. 60/904,368, filed on Mar. 2, 2007.

(51) Int. Cl.
*H04J 11/00* (2006.01)
*H04J 3/00* (2006.01)
*H04B 1/707* (2006.01)

(52) U.S. Cl. ........ 370/210; 370/335; 370/342; 370/509; 375/137; 375/150

(58) Field of Classification Search .......... 370/208–342, 370/509–519; 375/137–376, E1.025, E1.032, 375/E1.002; 455/502, 506; 725/127
See application file for complete search history.

(56) References Cited

U.S. PATENT DOCUMENTS 5,265,150 A 11/1993 Helmkamp et al.
6,141,332 A * 10/2000 Lavean ........................ 370/335
6,256,506 B1 7/2001 Alexander, Jr. et al.
6,445,904 B1 9/2002 Lovinggood et al.
6,697,603 B1 * 2/2004 Lovinggood et al. ........ 455/13.1
6,731,904 B1 5/2004 Judd
6,745,003 B1 6/2004 Maca et al.
6,889,033 B2 5/2005 Bongfeldt
6,934,511 B1 8/2005 Lovinggood et al.
6,990,313 B1 1/2006 Yarkosky
(Continued)

FOREIGN PATENT DOCUMENTS

WO WO9829962 A2 7/1998
(Continued)

OTHER PUBLICATIONS

International Search Report and Written Opinion-PCT/US08/055738, International Search Authority-European Patent Office. Dec. 22, 2008.

(Continued)

*Primary Examiner* — Afsar M. Qureshi
(74) *Attorney, Agent, or Firm* — Linda G. Gunderson

(57) ABSTRACT

Methods and systems are provided to generate digital coefficients for a filter. The generation of coefficients relies on a Fourier transformation of an impulse response in time domain that is zero padded, e.g., zeros are appended to an array corresponding to a sampled input signal of length M. A unit prototypical filter is generated through a frequency domain response of length $N_{FFT}=N_S+M-1$, wherein $N_S$ is a sampling length of the incoming signal. The unit prototypical filter is then circularly shifted in order to generate a band pass filter centered at a desired frequency. Circularly shifted filters are point-to-point added to generate a set of composite digital coefficients to filter the incoming signal. The reference frequencies for the composite filter are extracted from a message received from one or more base stations associated with one or more service providers. The composite filter typically operates on a frequency repeater.

26 Claims, 18 Drawing Sheets

U.S. PATENT DOCUMENTS

| | | | |
|---|---|---|---|
| 7,027,770 | B2 | 4/2006 | Judd et al. |
| 7,035,587 | B1 | 4/2006 | Yarkosky |
| 7,068,973 | B1 | 6/2006 | Lovinggood et al. |
| 7,088,953 | B2 | 8/2006 | Bongfeldt |
| 7,263,293 | B2 | 8/2007 | Ommodt et al. |
| 7,333,771 | B2 | 2/2008 | Maxwell |
| 2004/0147221 | A1 | 7/2004 | Sheynblat et al. |
| 2006/0030262 | A1 | 2/2006 | Anderson et al. |
| 2006/0205343 | A1 | 9/2006 | Runyon et al. |
| 2006/0264174 | A1 | 11/2006 | Moss |
| 2007/0109962 | A1 | 5/2007 | Leng et al. |

FOREIGN PATENT DOCUMENTS

| | | |
|---|---|---|
| WO | 02054628 | 7/2002 |
| WO | WO03093859 | 11/2003 |
| WO | WO2006099209 A2 | 9/2006 |

OTHER PUBLICATIONS

Amihai, Koo: "Design of Multiplierless FIR Digital Filters With Two to the N th Power Coefficients" IEEE Transactions on Consumer Electronics, vol. 52, No. 3, Aug. 1987, pp. 109-114, XP011158561.

Chen et al., "Transmission Filters With Multiple Flattened Passbands Based on Chirped Moire Gratings" IEEE Photonics Technology Letters, vol. 10, No. 9, Sep. 1998, XP011046212.

Juseop Lee, Sarabandi: "Design of Triple-Passband Microwave Filters Using Frequency Transformations" IEEE Transactions on Microwave Theory and Techniques, vol. 56, No. 1, Jan. 2008, pp. 187-193, XP011198986.

Macchiarella, Tamiaiio: "Design techniques for dual-Passband filters" IEEE Transactions on Microwave Theory and Techniques, vol. 53, No. 11, Nov. 2005, pp. 3265-3271, XP001512574.

* cited by examiner 700
701
702
704
706
708
710
712
714
716
718
756
DIPLEXER
DUPLEXER
720
722
724
726
728
730
732
734
736
738
740
742
744
746
748
750
752
754
4
FIRST BAND TRANSCEIVER
FIRST BAND BASEBAND CIRCUITRY
SECOND BAND BASEBAND CIRCUITRY
SECOND BAND TRANSCEIVER

SUPERIMPOSED COMPOSITE CHANNEL FILTER

CLAIM OF PRIORITY

This application claims priority to U.S. Provisional Patent Application Ser. No. 60/904,368, filed on Mar. 2, 2007, entitled, "ADAPTIVE SAME FREQUENCY REPEATER TECHNIQUES," which is herein incorporated by reference in its entirety.

BACKGROUND

Conventionally, the coverage area of a wireless communication network such as, for example, a Time Division Duplex (TDD), Frequency Division Duplex (FDD) Wireless-Fidelity (Wi-Fi), Worldwide Interoperability for Microwave Access (Wi-max), Cellular, Global System for Mobile communications (GSM), Code Division Multiple Access (CDMA), or 3G based wireless network can be increased by a repeater. Exemplary repeaters include, for example, frequency translating repeaters or same frequency repeaters which operate in a physical layer or data link layer as defined by the Open Systems Interconnection Basic Reference Model (OSI Model).

Physical layer repeaters can be categorized into "same frequency" or "frequency translating" devices. The network architecture associated with where the repeater is going to be deployed will govern type of repeater used. If a same frequency repeater is used, this requires that the repeater receives and transmits on the same frequency concurrently. Accordingly, the repeater must achieve isolation between the receiver and transmitter using various antenna and digital/analog cancellation techniques. If a frequency translating repeater is used, the repeater receives a signal on a first frequency channel and then translates that to a second frequency channel for concurrent transmission. In this manner, isolation between the transmitter and receiver is achieved to a certain extent through frequency separation. Preferably, the antennas for receiving and transmitting as well as repeater circuitry are included within a same packaging in order to achieve manufacturing cost reductions, ease of installation, or the like. This is particularly the case when the repeater is intended for use by a consumer as a residential or small office based device where form factor and ease of installation is an important consideration. In such device, one antenna or set of antennas usually face, for example, a base station, access point, gateway, or another antenna or set of antennas facing a subscriber device.

For a repeater which receives and transmits concurrently, isolation between the receiving and transmitting antennas is a significant factor in overall repeater performance—this is the case whether repeating to the same frequency or repeating to a different frequency. More particularly, if the receiver and the transmitter antennas are not isolated properly, performance of the repeater can significantly deteriorate. Generally, gain of the repeater cannot be greater than the isolation to prevent repeater oscillation or initial de-sensitization. Isolation is generally achieved by physical separation, antenna patterns, or polarization. For frequency translating repeaters, additional isolation may be achieved utilizing band pass filtering, but antenna isolation generally remains a limiting factor in the repeater's performance due to unwanted noise and out of band emissions from the transmitter being received in the receiving antenna's in-band frequency range. The antenna isolation from the receiver to transmitter is an even more critical problem with repeaters operating on same frequencies and where band pass filtering does not provide additional isolation.

Often cellular based systems have limited licensed spectrum available and cannot make use of frequency translating repeating approaches and therefore use repeaters utilizing the same receive and transmit frequency channels.

As mentioned above, for a repeater intended for use with consumers, it would be preferable to manufacture the repeater to have a physically small form factor in order to achieve further cost reductions, ease of installation, and the like. However, the small form can result in antennas disposed in close proximity, thereby exasperating the isolation problem discussed above.

Current repeaters suffer an additional significant drawback in that they are not capable of separating leakage from their own transmitters from the signal they wish to repeat. As a result, conventional repeaters typically cannot optimize their system isolation and performance on real time bases resulting in poor operation or destructive effects to overall network performance. Specifically, current practices do not allow for the adaptive cancellation of unwanted signals in repeater environments while allowing the repeater to operate generally. Instead, current repeater deployments offer limited cancellation loops due to cost and complexity, are discrete implementations, and generally deployed in single band systems with no sub-band filtering. Further, current deployments of interference cancellation loops assume multipath delays and suffer from excess or unmatched delay in scattered signals, changing delays in signals (e.g., Doppler), and limited cancellation for wide band signals (e.g., ICs bandwidth).

From the foregoing, it is readily apparent that there exists a need for systems and methods to overcome the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject specification describes methods and systems to generate digital coefficients for a filter. The generation of coefficients relies on a Fourier transformation of an impulse response in time domain that is zero padded, e.g., zeros are appended to an array corresponding to a sampled input signal of length M. A unit prototypical filter is generated through a frequency domain response of length $N_{FFT}=N_S+M-1$, wherein $N_S$ is a sampling length of the incoming signal. The unit prototypical filter is then circularly shifted in order to generate a band pass filter centered at a desired frequency. Circularly shifted filters are point-to-point added to generate a set of composite digital coefficients to filter the incoming signal. The reference frequencies for the composite filter are extracted from a message received from one or more base stations associated with one or more service providers. The composite filter typically operates on a frequency repeater.

In an aspect set forth herein, a method for generating digital filter coefficients utilized in a wireless environment is disclosed, the method comprising: appending zeros to an M-sample impulse response in time domain to create a zero padded impulse response of $N_{FFT}$ in length, wherein M and $N_{FFT}$ are positive integers; Fourier transforming the $N_{FFT}$ length zero-padded impulse response; performing a circular shift of the Fourier-transformed zero-padded impulse response; and adding in frequency domain a set of circularly-shifted, Fourier-transformed zero-padded impulse responses to generate a set of composite digital filter coefficients.

In another aspect, the subject innovation discloses a processor configured to generate an M sample impulse response in time domain, to perform an array padding operation, wherein M is a positive integer; to compute a Fourier transformation of at least one of the M-bin impulse response or an $N_{FFT}$-bin frequency sequence, wherein $N_{FFT}$ is a positive integer; perform a circular shift of an $N_{FFT}$-bin Fourier transformed impulse response; to add a set of Fourier transformed zero-padded impulse responses; to generate a composite mask filter utilizing the added Fourier-transformed impulse responses; and a memory coupled to the processor.

An apparatus that operates in a wireless environment, the apparatus comprising: means for zero padding an M-bin impulse response in time domain to an $N_{FFT}$-bin length, wherein M and $N_{FFT}$ are positive integers; means for Fourier transforming the $N_{FFT}$-bin zero-padded impulse response; means for performing a circular shift of the Fourier-transformed zero-padded impulse response; means for adding in frequency domain a set of circularly-shifted, Fourier-transformed zero-padded impulse responses to generate a filter mask; means for conveying the generated filter mask to a frequency bin multiplier block; and means for applying the generated filter mask to a set of frequency domain bins of a block of signal to be repeated.

A computer program product comprising a computer-readable medium including: code for causing a computer to pad an M-bin impulse response in time domain to an NFFT-bin length, wherein M and NFFT are positive integers; code for causing a computer to Fourier transform the NFFT-bin zero-padded impulse response; code for causing a computer to perform a circular shift of the Fourier-transformed zero-padded impulse response; and code for causing a computer to add in frequency domain a set of circularly-shifted, Fourier-transformed zero-padded impulse responses to generate a filter mask; and code for causing a computer to apply the generated filter mask to a set of frequency domain bins of a block of signal to be repeated.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
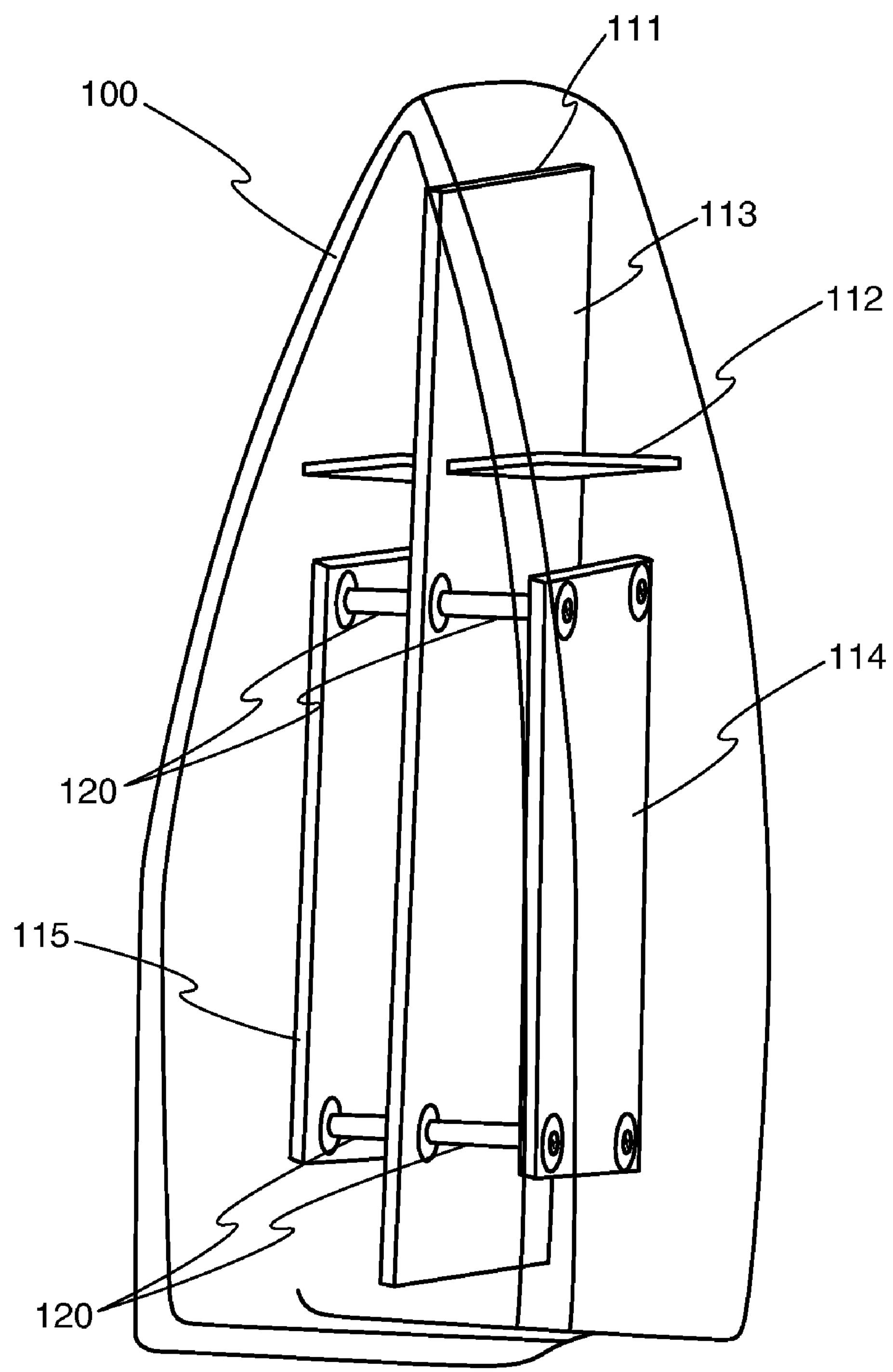
FIG. 1 is a block diagram of an exemplary enclosure of an illustrative repeater in accordance with aspects described herein.

The current disclosure is related to the following U.S. Patent Applications filed on Mar. 3, 2008: PHYSICAL LAYER REPEATER UTILIZING REAL TIME MEASUREMENT METRICS AND ADAPTIVE ANTENNA ARRAY TO PROMOTE SIGNAL INTEGRITY AND AMPLIFICATION, Ser. No. 12/041,598; CLOSED FORM CALCULATION OF TEMPORAL EQUALIZER WEIGHTS USED IN A REPEATER TRANSMITTER LEAKAGE CANCELLATION SYSTEM, Ser. No. 12/041,603; USE OF A FILTERBANK IN AN ADAPTIVE ON-CHANNEL REPEATER UTILIZING ADAPTIVE ANTENNA ARRAYS, Ser. No. 12/041,611; USE OF ADAPTIVE ANTENNA ARRAY IN CONJUNCTION WITH AN ON-CHANNEL REPEATER TO IMPROVE SIGNAL QUALITY, Ser. No. 12/041,615; AUTOMATIC GAIN CONTROL AND FILTERING TECHNIQUES FOR USE IN ON-CHANNEL REPEATER, Ser. No. 12/041,617; and CONFIGURATION OF A REPEATER, Ser. No. 12/041,621, the contents of each of which are hereby incorporated by reference in their entirety.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments can be practiced without these specific details. In other instances, well-known structures and devices are shown in block diagram form in order to facilitate describing one or more embodiments.

In addition, various aspects of the present invention are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems and apparatuses described herein are described in the context of boosting uplink pilot signals in a W-CDMA communications system. One skilled in the art should appreciate that similar techniques could apply to other communication environments.

As used in this application, the terms "component," "module," "system," and the like are intended to refer to a computer-related entity, either hardware, firmware, a combination of hardware and software, software, software in execution, firmware, middle ware, microcode, and/or any combination thereof. For example, a component can be, but is not limited to being, a process running on a processor, a processor, an object, an executable, a thread of execution, a program, and/or a computer. By way of illustration, not limitation, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a wireless terminal or user equipment (UE). A wireless terminal or UE can also be called a system, subscriber unit, subscriber station, mobile station, mobile, mobile device, remote station, remote terminal, UE, user terminal, terminal, wireless communication device, user agent, or user device. A wireless terminal or UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with wireless terminal(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. Additionally it should be appreciated that a carrier wave can be employed to carry computer-readable electronic data or instructions such as those used in transmitting and receiving voice mail, in accessing a network such as a cellular network, or in instructing a device to perform a specified function. Accordingly, the term "machine-readable medium" refers to various physical media capable of storing, containing, and/or carrying instruction(s) and/or data (but does not refer to vacuum). Additionally, the herein described systems and methods can be deployed as machine readable medium as part of wireless channels capable of storing, containing, and/or carrying instructions and/or data. Of course, those skilled in the art will recognize many modifications may be made to the disclosed embodiments without departing from the scope or spirit of the invention as described and claimed herein.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA), TD-SCDMA, and TD-CDMA. cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the above techniques may be described below in the context of uplink pilot multiplexing as it applies to LTE, and as a result, 3GPP terminology may be used in much of the descriptions below, where appropriate.

As discussed in greater detail below, methods and systems are provided to generate digital coefficients for a filter. The generation of coefficients relies on a Fourier transformation of an impulse response in time domain of a prototype filter that is zero padded, e.g., zeros are appended to the time domain impulse response The length of the prototype filter after zero padding should be $N_{FFT}=N_S+M-1$, wherein $N_S$ is a sampling length of the incoming signal. Likewise the data must be zero padded to the same length as zero padded prototype filter. The unit prototypical filter then has an $N_{FFT}$ performed on it followed by circular shifting in order to generate a band pass filter in the frequency domain centered at a desired frequency. Circularly shifted filters are point-to-point added to generate a set of composite digital coefficients to filter the zero-padded incoming signal with. The reference frequencies for the composite filter are extracted from a message received from one or more base stations associated with one or more service providers. The composite filter typically operates on a frequency repeater.

Referring initially to FIG. 1, it illustrates an exemplary enclosure for an illustrative repeater in accordance with various aspects described herein. A dipole dual patch antenna configuration along with repeater electronics can be efficiently housed in a compact enclosure 100 as shown in FIG. 1. Structure of the enclosure 100 can be such that it can be intuitively oriented in at least one of two ways; however, instructions can guide a user in connection with placement of the enclosure to maximize signal reception. In the exemplary dipole dual patch antenna configuration, a ground plane 113, incorporated with a printed circuit board (PCB) for the repeater electronics can be arranged between and parallel to two patch antennas 114 and 115 using, for example, standoffs 120. An isolation fence 112 can be employed to improve isolation in many instances.

Each of the patch antennas 114 and 115 can be arranged, for example, parallel to the ground plane 113 and can be printed on wiring board or the like, can be constructed of a stamped metal portion embedded in a plastic housing, or can be fabricated differently. A planar portion of the PCB associated with the ground plane 113 can include a dipole antenna 111 configured, for example, as an embedded trace on the PCB. Typically, the patch antennas 114 and 115 are vertically polarized and the dipole antenna 111 is horizontally polarized, although other embodiments may be used.

A combination of non-overlapping antenna patterns and opposite polarizations can be utilized to achieve approximately 40 dB of isolation between the receiving and transmitting antennas in a dual dipole dual patch antenna. Particularly, one of the transmitter and the receiver uses one of two dual switched patch antennas having vertical polarization for communication with an access point, while the other of the of the transmitter and the receiver employs the dipole antenna having horizontal polarization. This approach would be particularly applicable when the repeater is meant to repeat an indoor network signals to indoor clients. In this case, pattern of the antennas transmitting to the clients would typically need to be generally omni-directional, requiring use of the dual dipole antennas, as direction to the clients is unknown.

Figure 2:
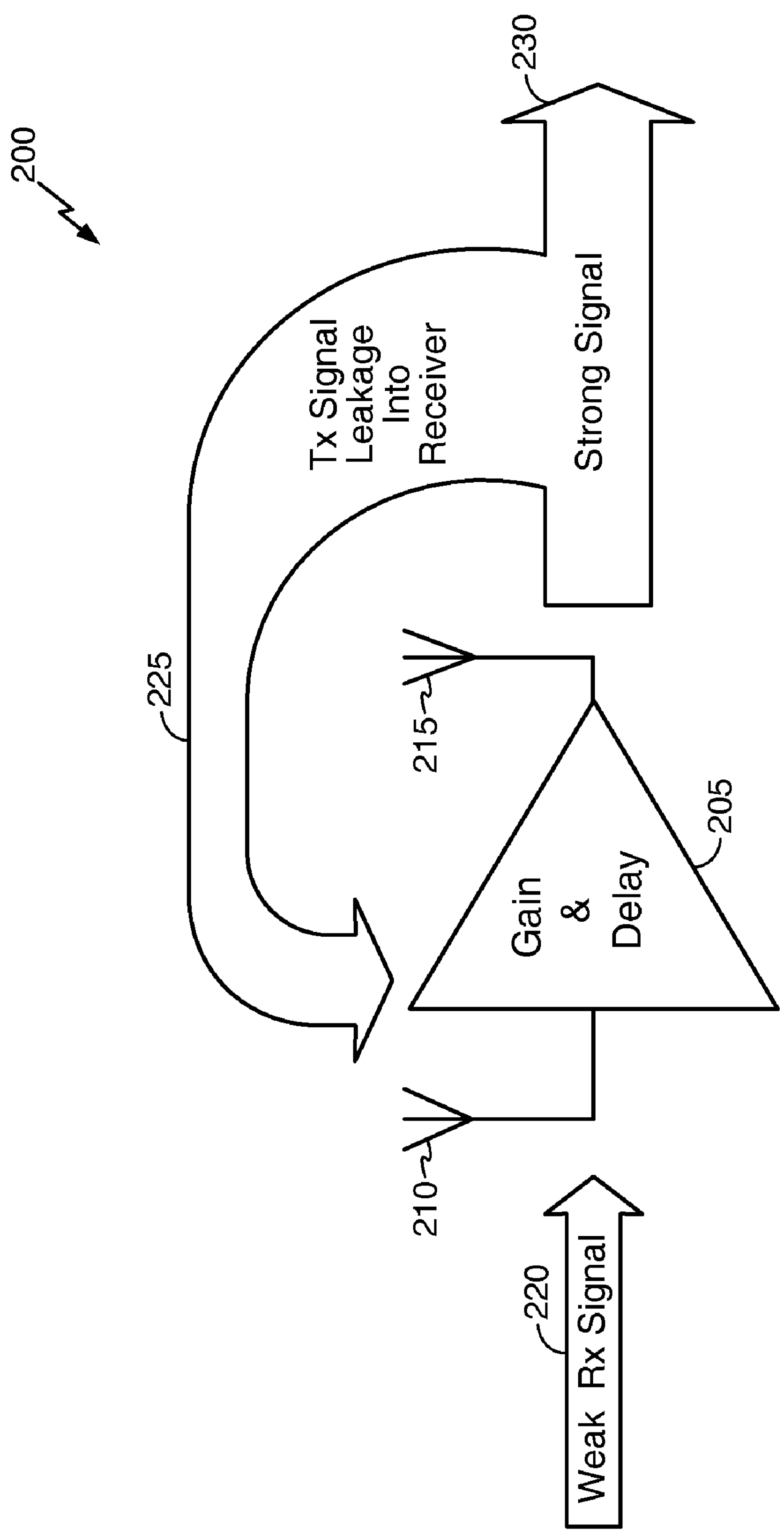
FIG. 2 is a block diagram of exemplary signal propagation for an exemplary RF repeater performing feedback cancellation in accordance with aspects described herein.

FIG. 2 depicts an illustrative block diagram of an exemplary signal flow within illustrative repeater environment 200. As shown, a weak received signal (the desired received signal) 220 can be received by antenna element 210, and act as input to gain and delay component 205. Gain and delay component 205 can process the weak received signal 220 to produce strong signal 230 as an output from antenna element 215. Further, a transmit signal leakage into receiver 225 can also act as input to gain and delay 205 at antenna element 210 for use when processing the weak received signal 220 to generate strong signal 230. The transmit leakage signal into the receiver 225 can be generated by a feedback cancellation loop (not shown) operatively coupled to the antenna elements 210 and 215. That is, the feedback cancellation loop generates a signal to be transmitted by the repeater, some of which is received by receiver 225 as a transmit leakage signal.

Figure 3:
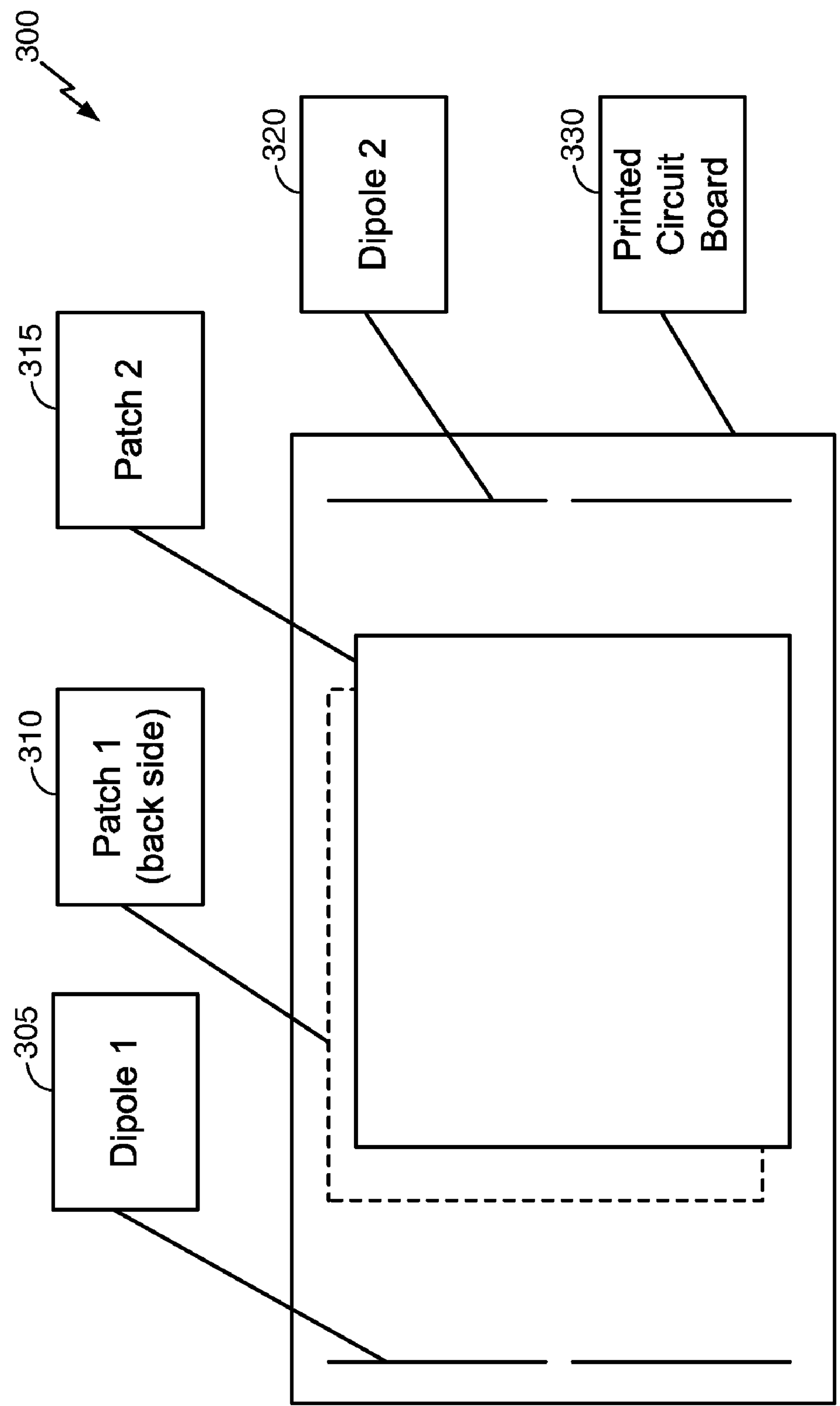
FIG. 3 is a block diagram of exemplary antenna repeater components in accordance with aspects described herein.

FIG. 3 illustrates interaction of antenna elements of an exemplary repeater environment 300. Exemplary repeater environment 300 comprises printed circuit board 330 which includes dipole antennas 305 and 320, and further includes patch antennas 310 and 3 15. In an illustrative implementation, the dipole/patch antenna combination can achieve selected isolation between transmit and receive channels to allow for implementation of desired feedback cancellation. The antenna configuration of FIG. 3 is an example of a configuration of the antenna arrays that may be used in other embodiments described herein (where, e.g., patch antenna 310 is part of one antenna array and patch antenna 315 is part of the other antenna array).

Figure 4:
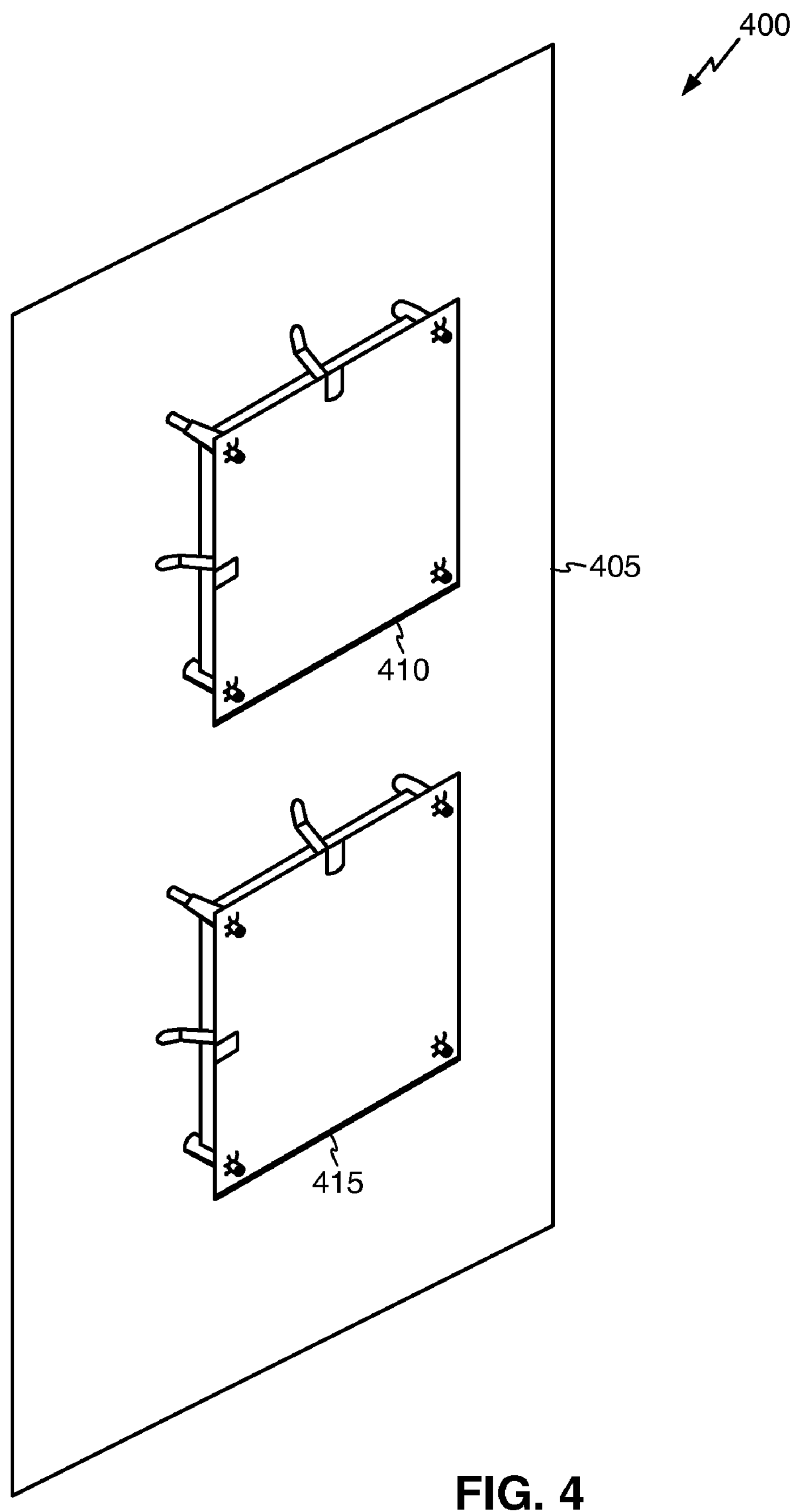
FIG. 4 is a block diagram of exemplary repeater components in accordance with aspects described herein.

FIG. 4 illustrates one side of another antenna configuration for use in providing selected isolation for an exemplary repeater. Antenna configuration 400 comprises PCB board 405 having one or more patch antennas 410 and 415 mounted thereto. Note that typically there would be a like number of antenna patches on the opposite side of PCB and typically orientated in an opposite or advantageous polarization when compared to the polarization of antennas 410 and 415, such that a sufficient or even maximum amount of isolation is achieved between the antennas on opposite sides of the PCB. In an illustrative implementation, PCB board 405 can comprise one or more patch antennas 410 and 415 in various configurations and have more than one pair of patch antennas as well as an uneven number of respective patch antennas that make up a superset thereof. Antenna configuration 400 can with the deployment of patch antennas 410 and 415 along with a like number of antenna on the opposite side of the PCB, provide selected isolation between a transmit and receive channel (e.g., transmit channels operatively coupled to one or more patch antennae and receive channels operatively coupled to one or more patch antennae) to cooperate with isolation and amplification provided by an exemplary cooperating feedback cancellation loop (e.g., feedback cancellation loop operatively coupled to an antenna array). The configuration of FIG. 4 shows another example of antenna arrays that can be used in embodiments described herein.

Figure 5:
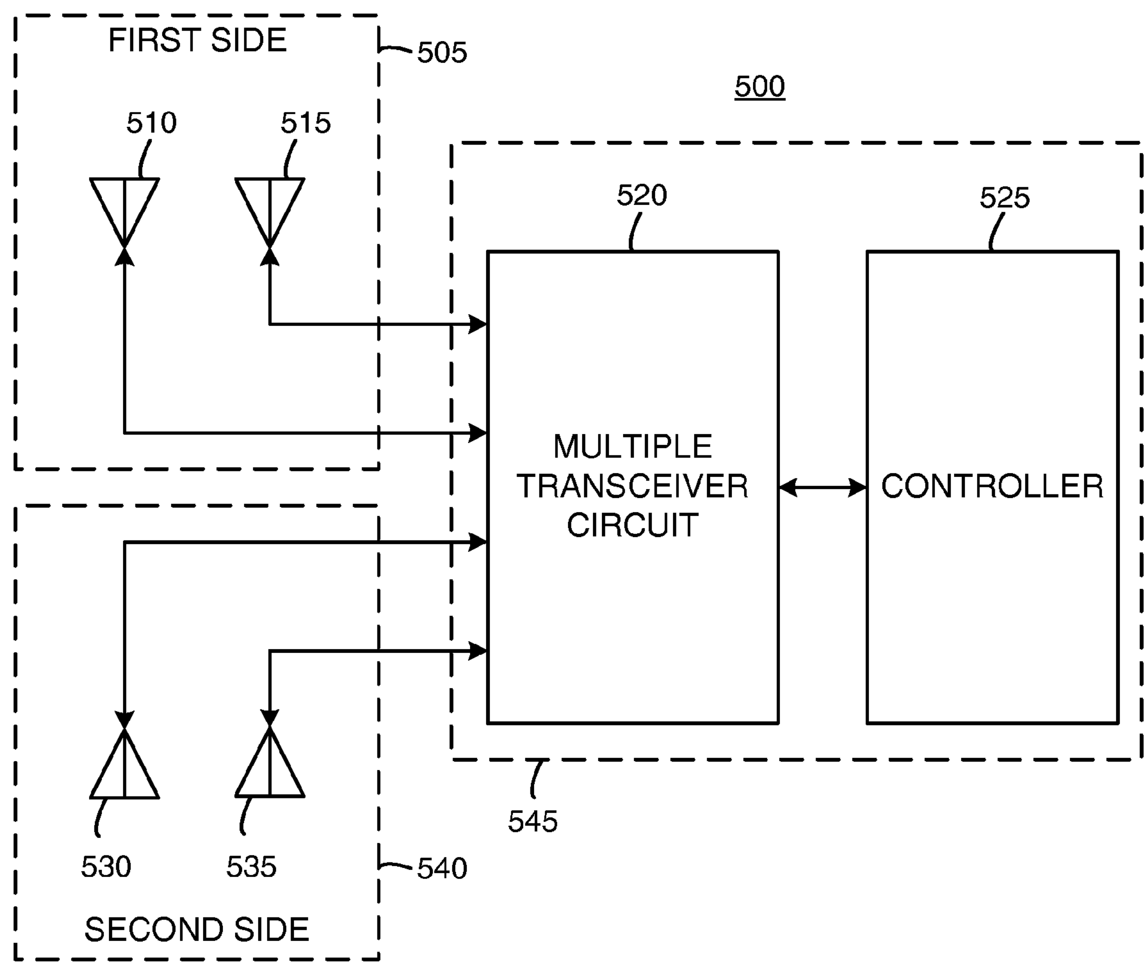
FIG. 5 is a block diagram of the cooperation of exemplary components of an illustrative RF repeater in accordance with aspects set forth herein.

FIG. 5 shows exemplary repeater environment 500 operative to perform signal conditioning and amplification using one or more antenna arrays. Exemplary repeater environment 500 comprises a first antenna array 505 having antenna elements 510 and 515, second antenna array having antenna elements 530 and 535, processing circuitry 545 comprising multiple transceiver circuit 520 and controller 525. The antenna arrays 505 and 540 can cooperate with multiple transceiver circuit 520 which cooperates with controller 525 as part of operations of exemplary repeater environment 500. Signals can be received by antenna arrays 505 and 540 and passed to processing circuitry 545 for signal conditioning and processing and then passed back to antenna arrays 505 and 540 for communication with one or more cooperating components (e.g., base station of a CDMA wireless communications network).

In an illustrative implementation, antenna arrays 505 and 540 can comprise additional antenna elements as required to perform method(s) as described infra to achieve adaptive feedback cancellation realized by cooperation of one or more antenna arrays and the application of one or more metrics, such as one or more correlation results. Further, the number and configuration of the antenna arrays described herein are merely illustrative as the herein described systems and methods contemplate use of varying number of antenna arrays having varying configurations and comprising varying number of antenna elements.

Figure 6:
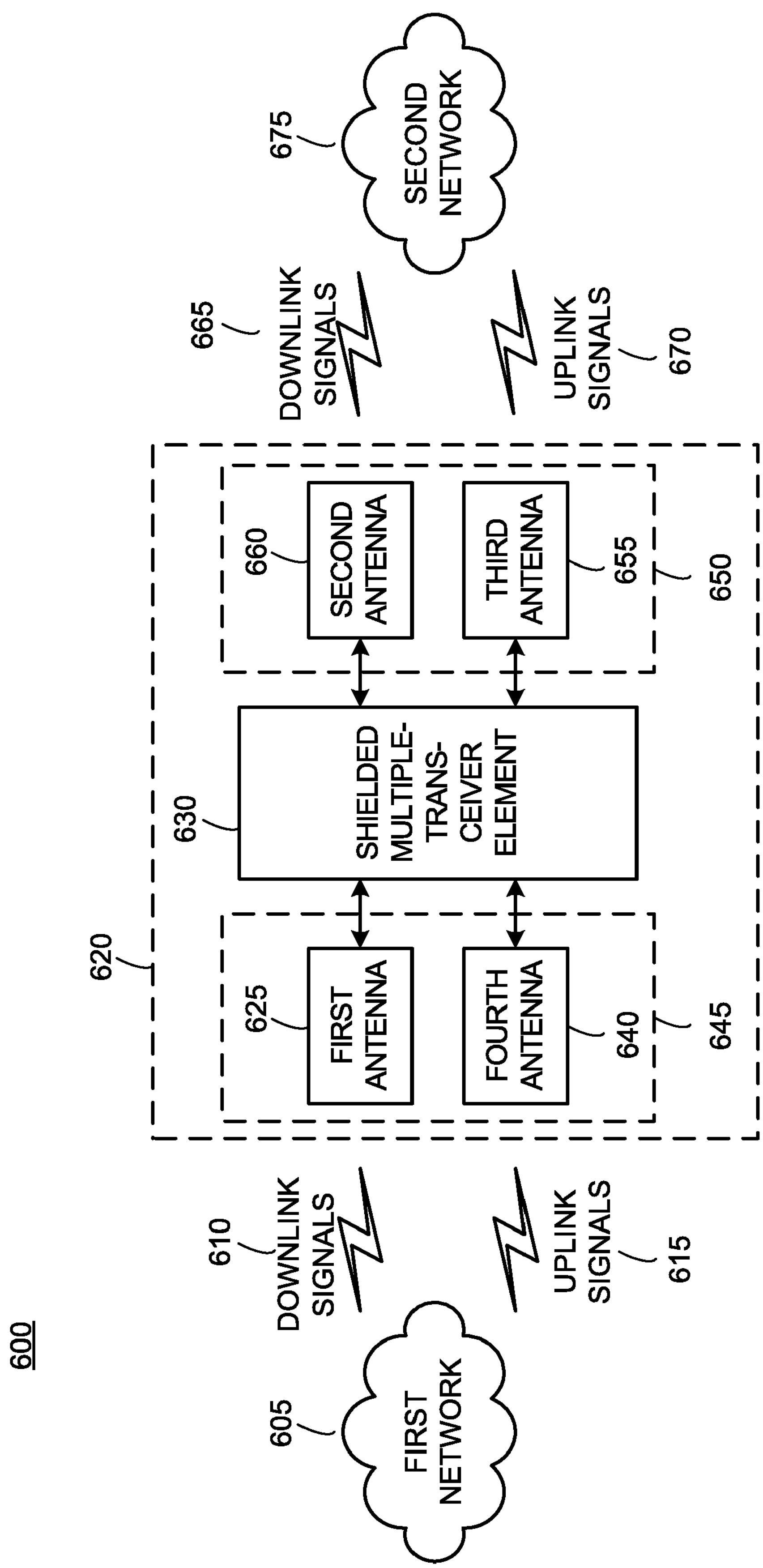
FIG. 6 is another block diagram of the cooperation of exemplary components of an illustrative RF repeater in accordance with aspects describing herein.

FIG. 6 illustrates interaction of exemplary repeater environment 600. Exemplary repeater environment 600 comprises processing circuitry 620 comprising antenna array 645 comprising first antenna 625 and fourth antenna 640, shielded multiple transceiver element 630, and antenna array 650 comprising second antenna element 660 and third antenna element 655. Operatively, downlink signals 610 originating from first network 605 can be processed by processing circuitry 620 to generate repeated downlink signals 665 for communication to second network 675, and uplink signals originating from second network 675 can be processed by processing circuitry 620 to generate repeated uplink signals 615 for communication to first network 605. Configuration and orientation of the antenna arrays 645 and 650 promote selected isolation of the unconditioned uplink and downlink signals provided to processing circuitry 620 and promote desired amplification and gain of such signals.

In an illustrative implementation, exemplary repeater environment 600 can comprise additional antenna elements as required to perform method(s) as described herein to achieve adaptive feedback cancellation realized by cooperation of one or more antenna arrays and the application of correlated metric. Further, it is appreciated that number and configuration of the antenna arrays described herein are merely illustrative as the herein described systems and methods contemplate use of varying number of antenna arrays having varying configurations and comprising varying number of antenna elements.

Figure 7:
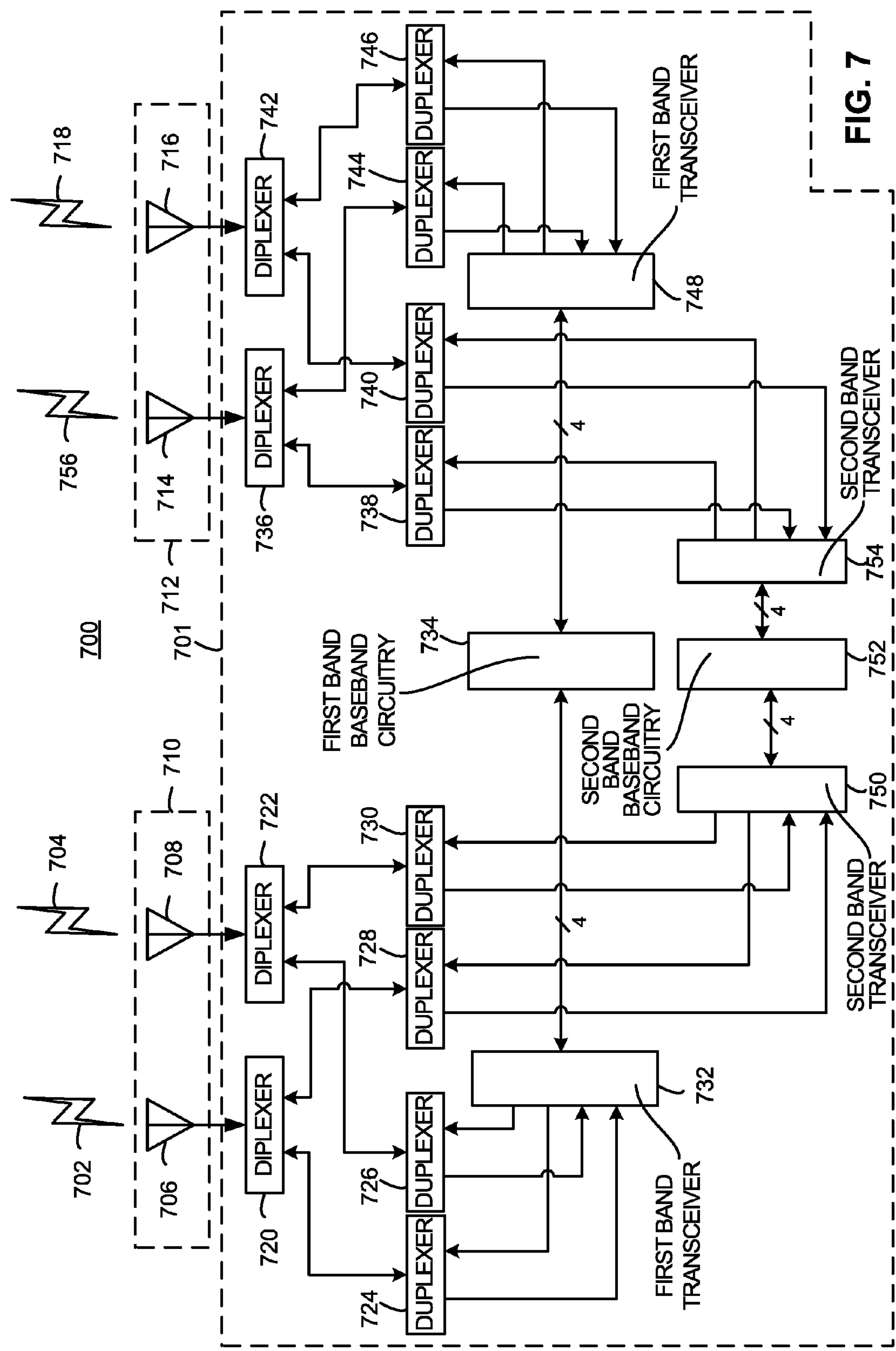
FIG. 7 is a block diagram of a frequency division duplexed (FDD) repeater having a dual band array in accordance with aspects described herein.

FIG. 7 is a block diagram of a four-antenna, multiple-transceiver device 700 configured to operate in multiple bands in accordance with various illustrative implementations. This device 700 can transmit signals freely across two different bands using a variable configuration of the available antennae.

As shown in FIG. 7, the device 700 can include a shielded multiple-transceiver element 701 having a first side 710 and a second side 712. The shielded multiple-transceiver element 701 includes first band transceivers 732 and 748, first band baseband circuitry 734, second band transceivers 750 and 754, second band baseband circuitry 752, duplexers 724, 726, 728, 730, 738, 740, 744, and 746; diplexers 720, 722, 736, and 742; the first side 710 includes antennae 706 and 708; and the second side 712 includes antennae 714 and 716. Although not shown, the device 700 includes at least one electromagnetic isolation element, as described above, providing electromagnetic (EM) isolation between the antennae 706 and 708 on the first side 710, and the antennae 714 and 716 on the second side 712.

Illustratively, the antenna 706 can send or receive signals 702; the antenna 708 can send or receive signals 704; the antenna 714 can send or receive signals 756; and the antenna 716 can send or receive signals 718. These antennae 706, 708, 714, and 716 may be planar (e.g., patch) antennae, or any other desirable antenna types that may be effectively isolated from each other.

The first band transceiver 732 is connected to the antennae 706 and 708 through the duplexers 724, 726, 728, and 730, and the diplexers 720, and 722 to send or receive data via the antennae 706 and 708. The first band transceiver 748 is connected to antennae 714 and 742 through duplexers 738, 740, 744, and 746, and diplexers 736, and 742 to send or receive data via antennae 714 and 716. The first band baseband circuitry 734 is connected between first band transceiver 732 and first band transceiver 748 to provide communication between these two circuits.

The second band transceiver 750 is connected to antennae 706 and 708 through duplexers 728 and 730, and diplexers 720 and 722 to send or receive data via antennae 706 and 708. The second band transceiver 754 is connected to antennae 714 and 716 through duplexers 738 and 740, and diplexers 736 and 742 to send or receive data via antennae 714 and 716. The second band baseband circuitry 752 is connected between second band transceiver 750 and second band transceiver 754 to provide communication between these two circuits.

Diplexers 720, 722 are connected between antennae 706 and 708, and duplexers 724, 726, 728, and 730. They illustratively operate to determine which signals will be passed between antennae 706 and 708 and first band transceiver 732, and between antennae 706 and 708 and second band transceiver 750.

Diplexers 720, 722 are configured to split signals based on frequency, passing signals of a first frequency band to/from duplexers 724 and 726, and passing signals of a second frequency band to/from duplexers 728 and 730.

Duplexers 726, 728 are connected between diplexers 720, 722, and first band transceiver 732; and duplexers 728, 730 are connected between diplexers 720, 722, and second band transceiver 750. These duplexers 724, 726, 728, 730 serve to route signals of slightly different frequencies within the first or second band, respectively, to properly direct transmitted or received signals between first and second band transceivers 732 and 750 and diplexers 720, 722.

Diplexers 738, 742 are connected between antennae 714 and 716, and duplexers 738, 740, 744, and 746. They operate, for example, to determine which signals will be passed between antennae 714 and 716 and first band transceiver 748, and between antennae 714 and 716 and second band transceiver 754.

The diplexers 738, 742 are configured to split signals based on frequency, passing signals of the second frequency band to/from duplexers 738 and 740, and passing signals of the first frequency band to/from duplexers 744 and 746.

Duplexers 738, 740 are connected between diplexers 736, 742, and second band transceiver 754; and duplexers 744, 746 are connected between diplexers 736, 742, and first band transceiver 748. These duplexers 738, 740, 744, 746 serve to route signals of slightly different frequencies within the first or second band, respectively, to properly direct transmitted or received signals between first and second band transceivers 748 and 754 and diplexers 736, 742.

In alternate illustrative implementations some of duplexers 724, 726, 728, 730, 738, 740, 744, and 746, or diplexers 720, 722, 736, and 742 may be eliminated, since in some embodiments, certain permutations of band and antenna may be prohibited.

In other illustrative implementations, signals from different bands can be specifically assigned to certain transmission orientations. In such embodiments, outputs of duplexers 724, 726, 728, 730, 738, 740, 744, and 746 can be directly connected to antennae 706, 708, 714, or 716. For example, the first band could be designated to transmit/receive using a horizontal orientation, and the second band could be designated to transmit/receive using a vertical orientation.

Although the above illustrative implementations show use of only two or four antennae, along with two transceivers, this is by way of example only. Multiple-antennae, multiple-transceiver devices using different numbers of antennae or transceivers can also be used.

Furthermore, although the above illustrative implementations show antennae that are separate from a PCB, alternate embodiments could form the antennae directly on the opposite sides of the PCB. In such embodiments, insulating layers within the PCB can form the required non-conductive support members to separate the antennae from the ground plane. Also, in such embodiments the transceiver will likely be formed off of the PCB, and connected to the antennae by wiring on the PCB. This sort of integrated structure can provide for a more compact device.

Figure 8:
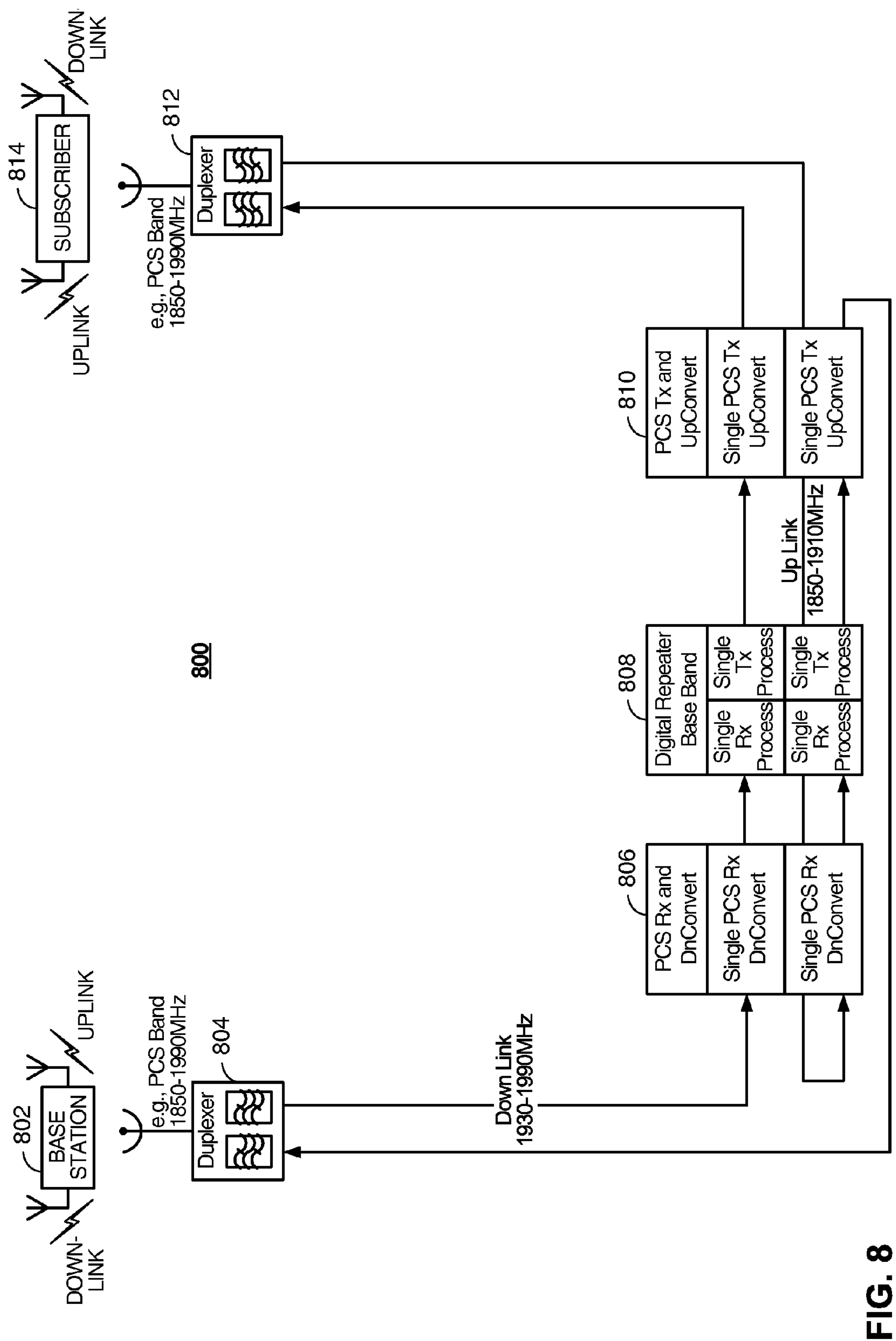
FIG. 8 is a block diagram of an exemplary FDD single band repeater having a digital interference cancellation system in accordance with aspects described herein.

FIG. 8 illustrates an exemplary repeater environment 800 operative to deploy an FDD single band with digital interference cancellation system in accordance with performing the exemplary method(s) described herein. As is shown, exemplary repeater environment 800 comprises duplexer 804 operatively coupled to an antenna element operative to receive signals from base station 802 and providing input signals to transceiver 806 and is operative to receive signals for processing from transceiver 806. Further, exemplary repeater environment comprises digital repeater baseband component 808 operatively coupled to transceiver 806 and transceiver 810 which is operatively coupled to duplexer 812. In an illustrative implementation, duplexer is operatively coupled to an antenna element that allows for the communication of signals to a cooperating subscriber component 814 (e.g., mobile handset).

In an illustrative operation, as described by the arrowed lines, the incident and transmitted signals can be processed by exemplary repeater environment 800 such that an exemplary feedback cancellation method(s) described herein.

Figure 9:
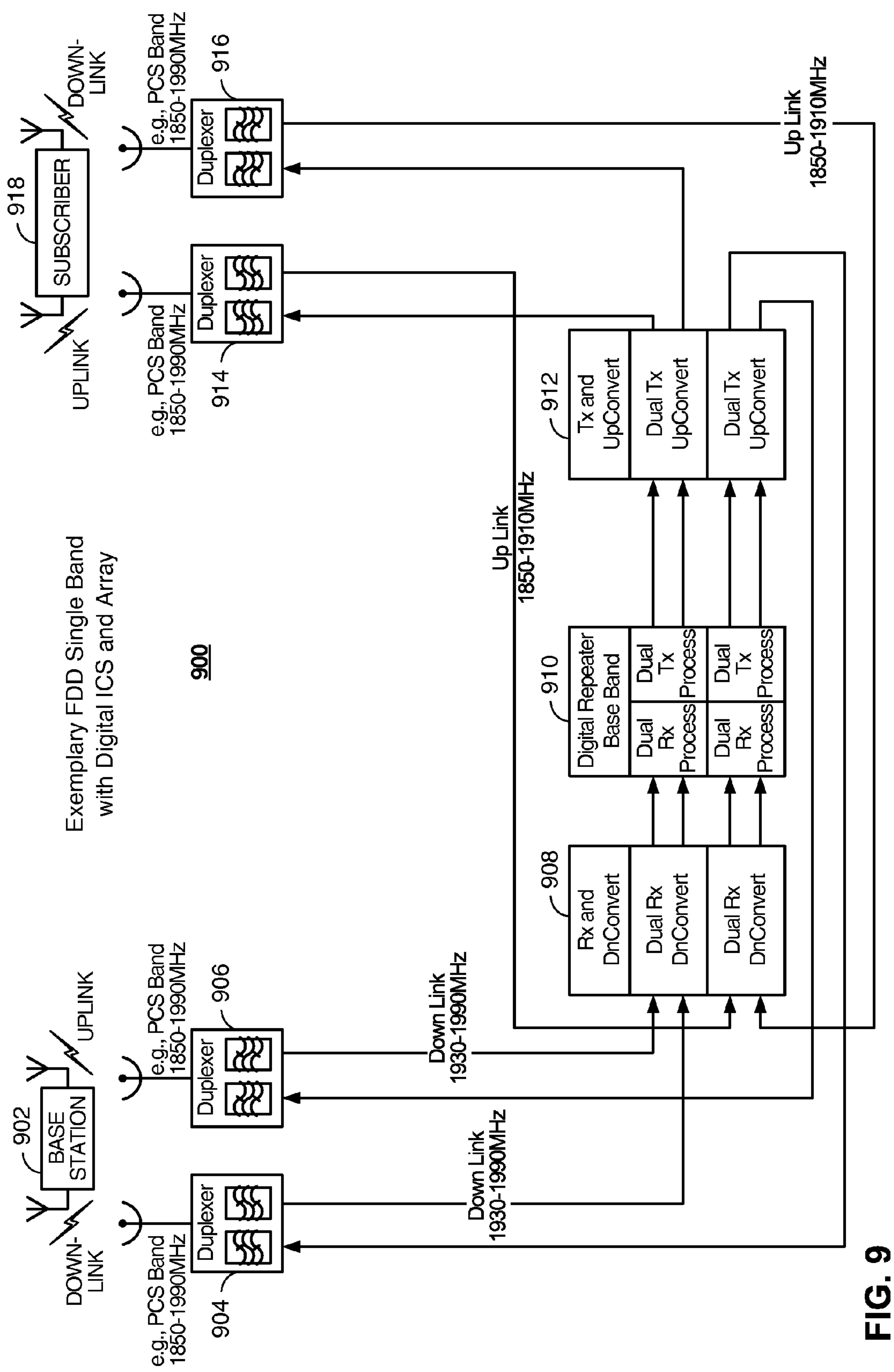
FIG. 9 is a block diagram of an exemplary FDD single band repeaters having a digital interference cancellation system and array in accordance with aspects described herein.

FIG. 9 illustrates exemplary repeater environment 900 operative to deploy an FDD single band with digital interference and an antenna array in accordance with the performing the exemplary method(s) described herein. As is shown, exemplary repeater environment 900 comprises duplexers 904, 906, 914, and 916; transceivers 908 and 912; and digital repeater base band 910. Duplexers 904, 906, 914, and 916 can be operatively coupled to one or more antenna elements that can receive/transmit signals from base station 902 and subscriber component 918.

In an illustrative operation, as described by the arrowed lines, the incident and transmitted signals can be processed by exemplary repeater environment 900 according to the exemplary feedback cancellation method(s) described herein.

Figure 10:
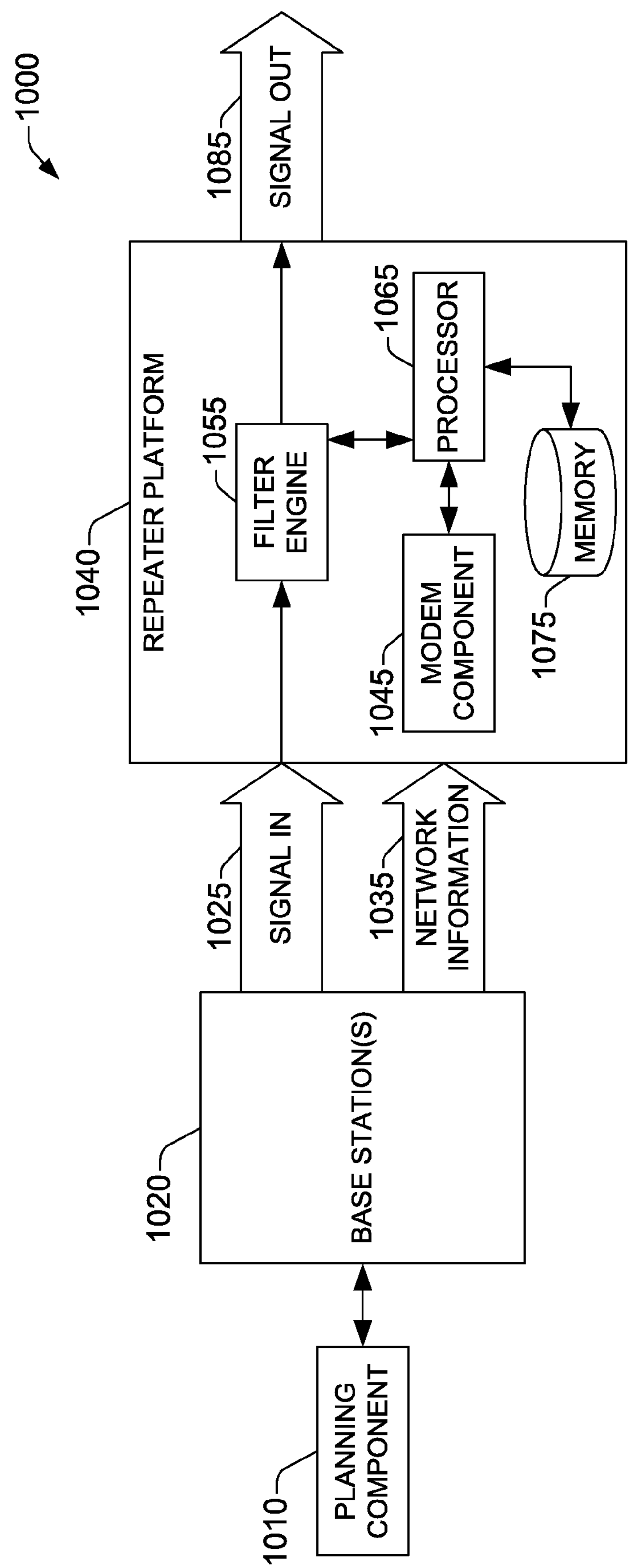
FIG. 10 is a block diagram of an example system that facilitates configuration of a frequency profile to be filtered and repeated according to aspects described herein.

FIG. 10 describes an example system 1000 that facilitates configuration of a repeater platform, or repeater. In system 1000, configuration of repeater component 1040 can proceed according to at least two primary protocols: (i) Location model and (ii) authorization model. In both models, a repeater platform 1040 receives network information 1035 from a base station 1020, through a forward communication link. In (i), the network information 1035 can comprise a set of identifiers associated with channels of a service provider that are available for communication (e.g., data, voice). In an aspect, such network information 1025 can be communicated in physical broadcast channels or in-band frames that are typically associated with a wireless technology utilized by the service provider. For example, in CDMA2000, network information 1025 can be conveyed in the paging channel. As another example, in a 802.11 or 802.16 technology, management frames can convey the set of identifiers. In example system 1000, a planning component 1010 can provide such information. In model (ii), an explicit authorization model can facilitate configuration of a repeater platform 1040. Such an authorization can be received through network information 1035.

In an aspect, repeater platform 1040 comprises a modem component 1045 and a filter engine 1055. In addition, a processor 1065 is coupled to each of such components and can be configured to provide at least a portion of the functionality of modem component 1045 and filter engine 1055. Modem component receives network information (e.g., a message in a control channel or in an overhead channel, or a set of management frames in the case of 802.11b/g or 802.16e technologies) and processes it in order to extract frequency information. Processing of the message can include demodulation acts that facilitate extracting information, such acts can comprise an inverse fast Fourier transform, pruning of cyclic prefixes or related time-guard intervals, demodulation according to the specific constellation (BPSK, QPSK, 4-QAM, 16-QAM) utilized to convey a received data stream, and so on. Additionally, modem component can conduct a cell search to detect available carriers and sub-carries (e.g., sub-bands), and perform time-frequency synchronization. It should be appreciated that modem component 1045 can also perform other acts associated with demodulation as it is know in the art for various wireless communication technologies. It should further be appreciated that while modem component 1045 is illustrated as a single functional block, modem component can comprise multiple modems, to ensure communication integrity through redundancy.

It is to be noted that modem component 1045 can facilitate management of the repeater platform 1040 operation through the service provider (via planning component 1010, for example). For example, planning component 1010 can shut down repeater platform 1040 operation at specific locations, or for specific purposes like network maintenance or reconfiguration (e.g., upon addition of a new base station). In addition, planning component can manage repeater operation according to network load, sector or cell interference, user tier-status, or power allocation scheme a base station(s) 1020.

Filter engine 1055 typically filters an input signal (e.g., signal in) at specific frequencies according to the received network information 1025. In an aspect, the network information can convey a specific set of channels that are available for communication associated with a specific service, and such channel frequencies are filtered and associated signal is repeated; e.g., signal out 1085. Filter engine 1055 can utilize various techniques that result in efficient (e.g., parallel low-complexity filtering through a sub-carrier-based filter bank, adaptive equalization based on signal fed back into signal input 1025, and so on) and advantageous (e.g., selective gain of signal out 1085, substantive antenna isolation among a receiver antenna and a transmit antenna) operation of the repeater. It should be appreciated that filter engine 1055 can also determine, via processor 1065 for example, a set of frequencies at which incoming signal (e.g., signal input 1025) is to be filtered and repeated. Such a determination can based on various factors such as one or more of a repeater platform 1040 location, cell/sector load or interference, other sector interference, serviced user tier, network integrity, and the like.

Figure 11:
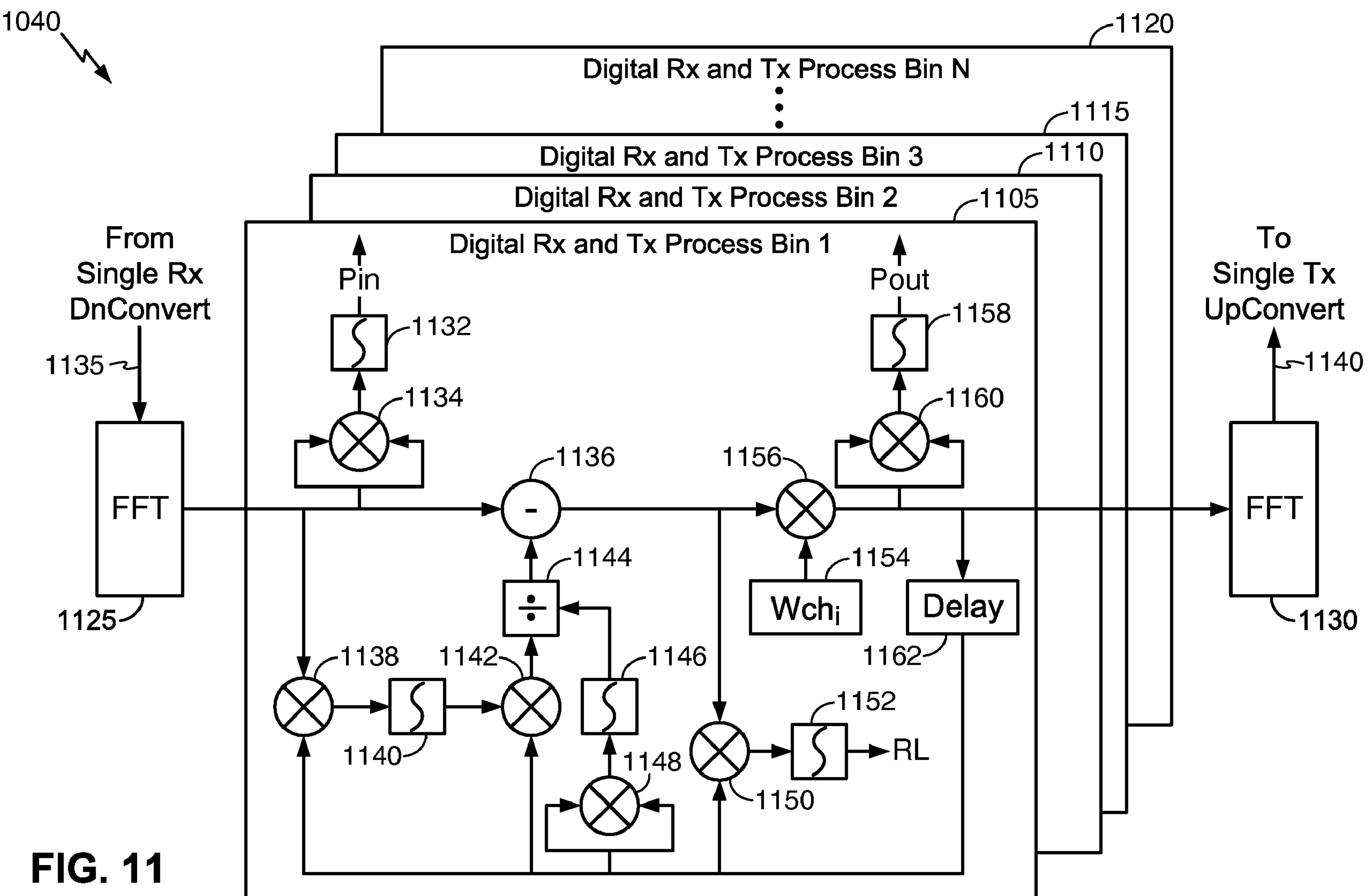
FIG. 11 is a block diagram that illustrates interaction of functional components of an example repeater platform 1040 that facilitate implementation of example methods described in the subject specification.

FIG. 11 is a block diagram 1100 that illustrates interaction of functional components of an example repeater platform 1040 that facilitate implementation of example methods described in the subject specification. As is shown, FIG. 11 shows an illustrative implementation of an exemplary repeater environment 1100 deploying weighting calculations and applying metrics as part of a feedback loop cancellation technique. Exemplary repeater environment 1100 is operative to execute one or more digital receive and transmit processes bins as described by Bin 1 1105, Bin 2 1110, Bin 3 1115, up to Bin N 1120. Further, the inputs and outputs of the digital receive and transmit process bin can comprise fast Fourier transform (FFT) modules 1125 and 1130; processor 1165 can execute at least a portion of computations conducted by such modules.

In an illustrative operation, signal (e.g., signal 1025) can be incident on antenna element 1135 for processing by repeater platform 1040. The received signal (e.g., signal 1025) can be processed according to FFT module 1125 of one or more receive and transmit process bins Bin 1 1105 to Bin N 1120, the output of which can be passed along to the input of multiplier 1138, subtraction component 1136, and multiplier component 1134. The output of multiplier component can act as input to adder component 1132 to generate selected values for use in filter bank operations. The output of subtraction block 1136 can act as input to multiplier 1156 which takes the subtracted signal (e.g., a subtraction of the output of FFT module 1125 and division module 1144) and multiply by calculated weights from weight block 1154. The output of multiplier 1156 can act as input to multiplier 1160 the output of multiplier 1060 can act as input to summer 1158 which generates a selected value for use in filter bank operations. The output of multiplier 1154 can also act as input to delay block 1162 that can provide a selected time delay to the processed signal according to one or more filter bank operations.

The output of delay block 1162 can act as input to multiplier 1038 that multiplies the time delay with the output of FFT module 1125. The output of multiplier block 1038 can act as input to adder block 1140, the output of adder block 1140 acting as input to multiplier block 1142 operative to multiply the time delay from delay block 1162 with the output of adder block 1140. The output of multiplier block 1142 can act as input to division block 1144 which can divide the output of summer block 1142 with the output of multiplier block 1146, the output of division block 1044 can act as input to subtraction block 1136. Additionally, as is shown, the output of delay block 1162 can act as input to multiplier 1150 which can multiply the time delay from delay block 1162 with the output of subtraction block 1136. The output of multiplier block 1150 can act as input of adder block 1152 that generates selected values for filter bank operations. Further, the output of delay block 1162 can act as input to multiplier 1148 which multiplies the delay block output with itself. The output of multiplier block 1148 can act as input to adder block 1146, the output of adder block 1146 can act as input to division block 1144. Additionally, the output of multiplier block 1156 can act as input to FFT block 1130 that can perform one or more inverse FFT operations. The output of FFT block 1130 can be communicated to one or more cooperating components (e.g., subscriber module) using antenna element 1140.

Figure 12:
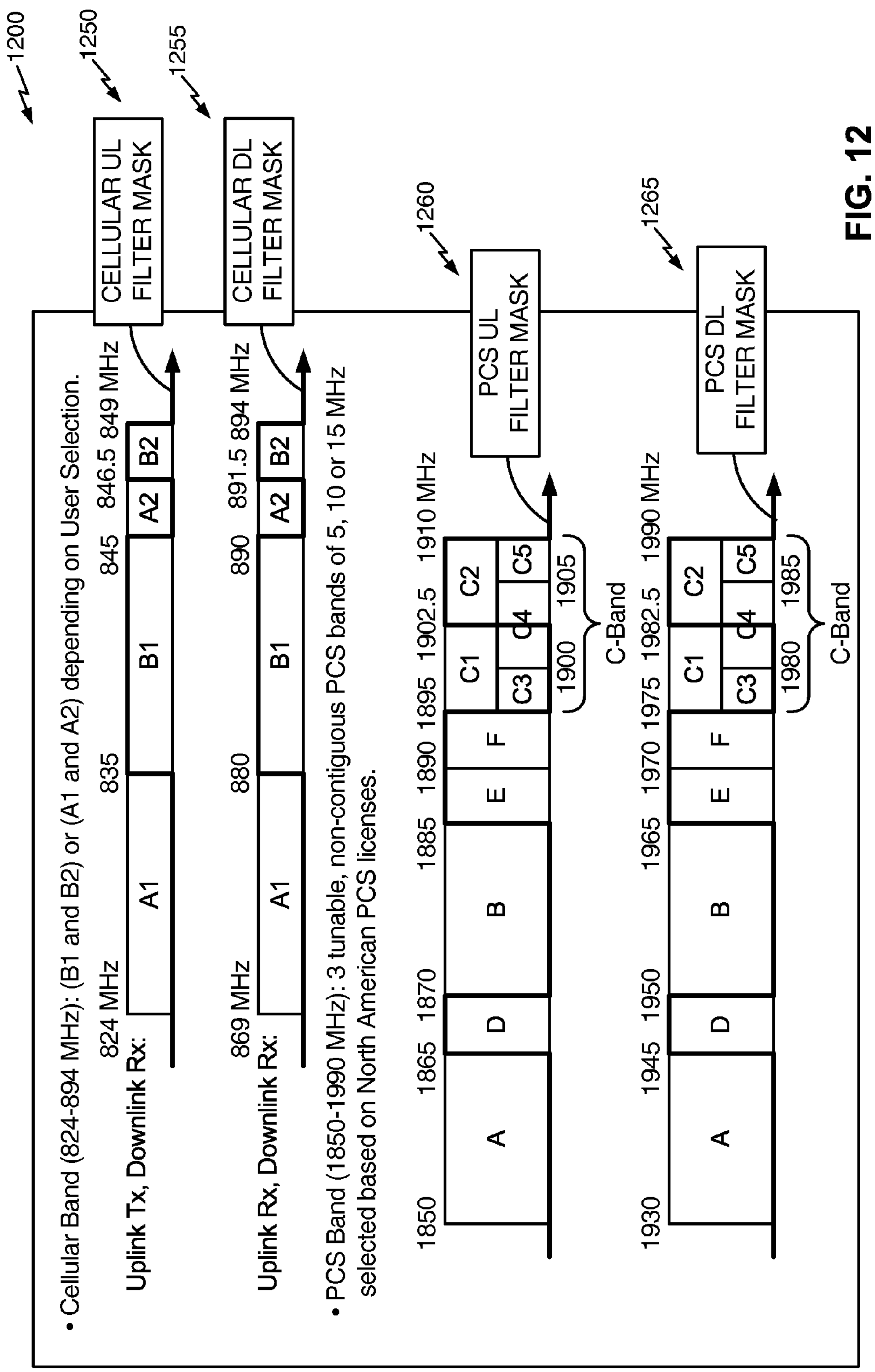
FIGS. 12 illustrates frequency profiles which can be utilized for digital filter mask generation according to aspects described herein.

FIG. 12 illustrates example frequency information that can be received in network information 1035, for example, as a list of sub-bands, or channels to be filtered. Cellular filter masks for UL (e.g., mask 1250) and DL (e.g., mask 1255) pass B1 and B2 bands, whereas the mask filters A1 and A2 bands. For PCS, mask for UL 1260 passes D, E, F, C2 and C5 bands, while blocking A, B, C1, and C3. Similar masking takes place for mask 1265 for DL. Modem component 1045 can demodulate the message, via processor 1065, and convey a received list of channels to filter engine 1055. The list of channels, or sub-bands, is then filtered or allowed to pass, depending on an indication received in conjunction with the list, and information contained in the authorized channels (e.g., channels allowed to pass through the filter) can be repeated according to aspects described hereinbefore.

Figure 13:
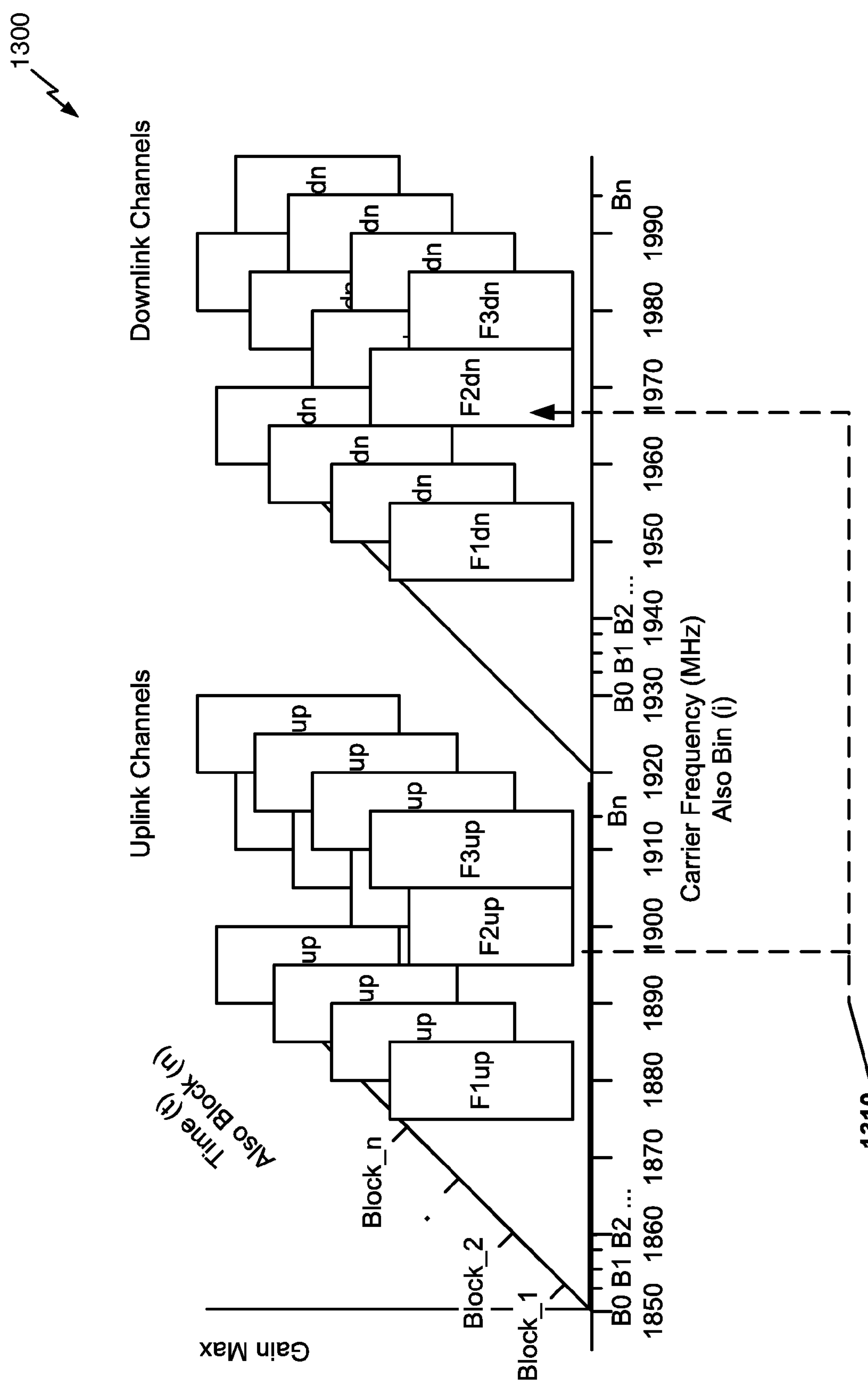
FIG. 13 is a block diagram illustrating the decomposition of an input signal according to a digital filter mask based on configured frequency profiles.

FIG. 13 is a block diagram 1300 illustrating the decomposition of an input signal according to a composite digital filter mask. Generally, FDD systems tend to have paired carriers that are a fixed spacing apart as shown by point 1310; such as the 80 MHz shown in this example. For an example communications system, power control can be managed by controlling the amount of additional gain added to the system by a repeater such that the power is balanced between the uplink (repeater to base station) and downlink (repeater to handset). In diagram 1300, illustratively, the amount of gain added by the repeater to F2up and the amount of gain to F2dn can be set to the same value. In the provided example, the same would apply for F1, F3, etc. In the example provided, the maximum amount of allowable gain (Gmax) for the uplink and down link can be different since the up-link and down-link can operate at a different frequency and that local scatters for the antennas facing inside can be different than the local scatters for the antenna facing outside the house; thus care needs to be taken to balance the amount of gain actually added to the uplink and downlink.

Figure 14:
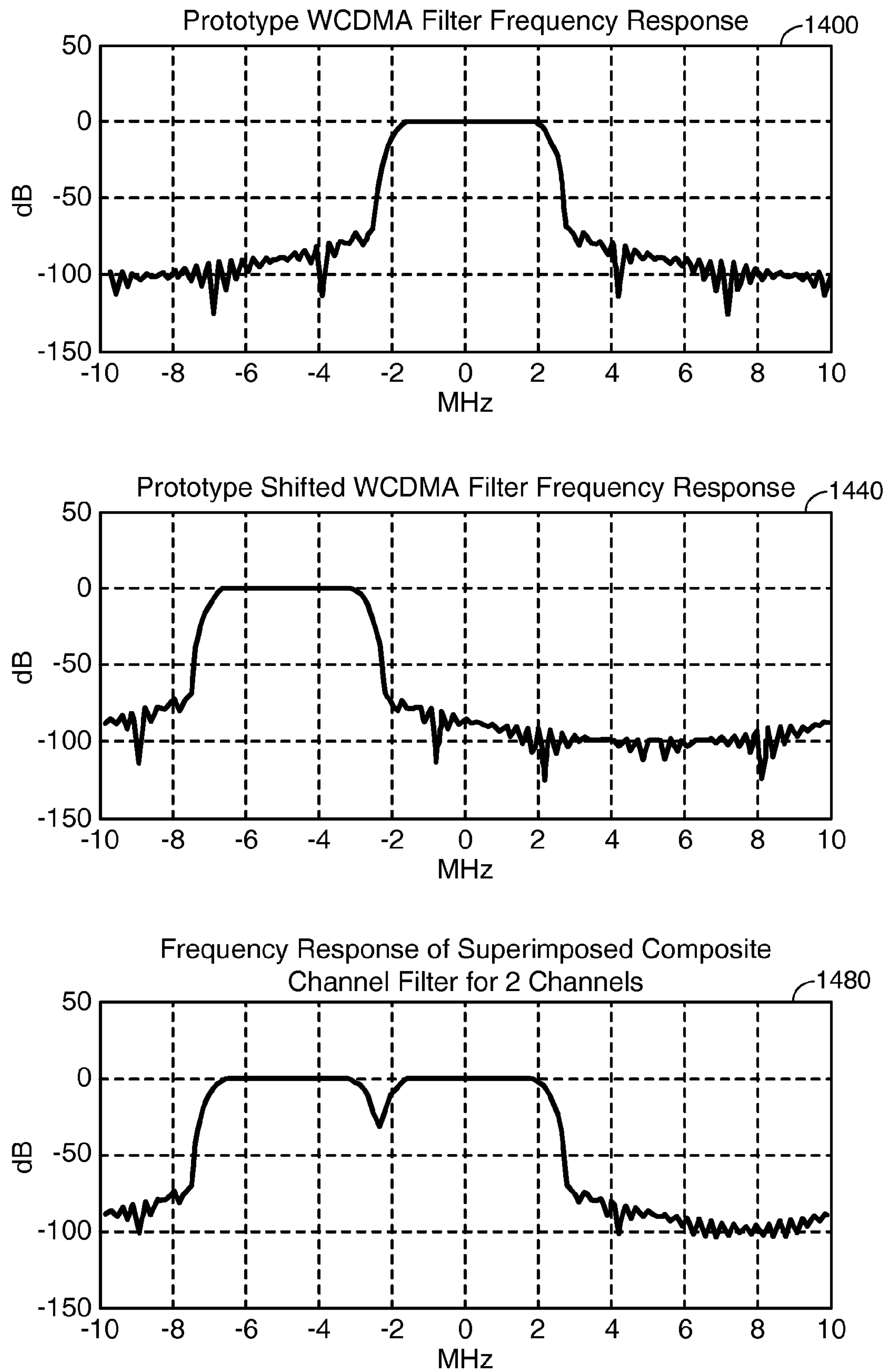
FIG. 14 illustrates an example digital filter mask, or set of digital coefficients, generated according to aspects described herein.

FIG. 14 illustrates an example digital filter mask generated according to aspects described herein. Panel 1400 displays the spectral response of a unit, or prototype, digital filter that can be utilized to generate a composite digital frequency mask to filter and repeat frequency channels according to received frequency information. The unit filter is created according to a methodology based on Fourier transforming a time impulse response, as illustrated in method 1600. The bandwidth $\nu_{BW}$ of the frequency response of the example prototype filter is typically determined by the particular standard (CDMA, WCDMA, GSM, etc) to be repeated. In addition, bandwidth of the filter can be received in a message from a service provider, as discussed in connection with FIGS. 10 and 12. In panel 1400, the prototype filter matches a standard, and a filter engine (e.g., filter engine 1055) which can exploit the prototype filter, resides in a location where a desired signal with a matching bandwidth can be received.

In panel 1400, bandwidth is nearly 4 MHz. It should be appreciated that bandwidth of the unit, prototype digital filter is limited by a frequency bin resolution $\Delta\nu$, or tap frequency.

Panel 1440 illustrates a circularly shifted frequency response for the example prototype filter. The circularly shifted instance of the unit, prototype filter in panel 1400 can be utilized to match a second desired carrier to filter (e.g., to band pass). A circular shift $\Delta\nu_0$ is typically limited by bin resolution in frequency, which is determined by the sampling rate, or number of taps, employed to sample an incoming signal (e.g., signal 1025). It is to be noted that multiple prototype filters are typically generated and circularly shifted in order to attain a desired composite digital filter mask, or set of filter coefficients. Additionally, generated circularly shifted filters are stored in a memory (e.g., memory 1075). It should be appreciated that the spectral position of the pass-band unit, prototype filter can be determined from a list of supported carriers, wherein the list can be received within network information 1035 conveyed by base station(s) 1020. Panel 1480 illustrates a point-by-point, or bin-by-bin, summation of two prototype filters with a same bandwidth that are composed to generate a 2×4 MHz wide filter. Moreover, prototype filters with disparate bandwidths can be added point-by-point to generate a desired set of digital coefficients.

It should be appreciated that for advantageous filtering operation of a SCCF to a data stream, or incoming signal, in addition to zero padding the time domain input response of the prototype filter, the data received through sampling an input signal, as illustrated in FIG. 13, is to be zero padded. The zero padding of the data is to performed to the same length the filter response function is padded. An operational sample, or bin, length must satisfy $$N_{FFT} \geqq N_S + M - 1,$$

where $N_S$ is the length of data sampling and M is the length of filter impulse response. It is to be noted that by zero padding the data and filter time-domain impulse response, direct multiplication of the filter and the data bins in the frequency domain can be achieved without substantial distortions typically associated with approximating, in time domain, a linear convolution with a circular convolution.

The systems and methods for efficiently representing knowledge of the herein described systems and methods may also be applied to the context of resolving in memory data on the same provider. In such context, the in memory data may not be backed by a physical store, e.g., it might be used in a graph solver on the CPU to synchronize nodes. The herein described systems and methods may also be applied in the context of scene graphs, especially as they become more distributed on multi-core architectures and calculations are written directly to an in memory data structure such as a volumetric texture.

There are multiple ways of implementing the present herein described systems and methods, e.g., an appropriate API, tool kit, driver code, operating system, control, standalone or downloadable software object, etc. which enables applications and services to use the systems and methods for representing and exchanging knowledge in accordance with the herein described systems and methods. The herein described systems and methods contemplate the use of the herein described systems and methods from the standpoint of an API (or other software object), as well as from a software or hardware object that performs the knowledge exchange in accordance with the herein described systems and methods. Thus, various implementations of the herein described systems and methods may have aspects that are wholly in hardware, partly in hardware and partly in software, as well as in software.

The word “exemplary” is used herein to mean serving as an example, instance, or illustration. For the avoidance of doubt, the subject matter disclosed herein is not limited by such examples. In addition, any aspect or design described herein as “exemplary” is not necessarily to be construed as preferred or advantageous over other aspects or designs, nor is it meant to preclude equivalent exemplary structures and techniques known to those of ordinary skill in the art. Furthermore, to the extent that the terms “includes,” “has,” “contains,” and other similar words are used in either the detailed description or the claims, for the avoidance of doubt, such terms are intended to be inclusive in a manner similar to the term “comprising” as an open transition word without precluding any additional or other elements. As mentioned above, while exemplary embodiments of the herein described systems and methods have been described in connection with various computing devices and network architectures, the underlying concepts may be applied to any computing device or system in which it is desirable to synchronize data with another computing device or system. For instance, the synchronization processes of the herein described systems and methods may be applied to the operating system of a computing device, provided as a separate object on the device, as part of another object, as a reusable control, as a downloadable object from a server, as a “middle man” between a device or object and the network, as a distributed object, as hardware, in memory, a combination of any of the foregoing, etc.

Thus, the methods and apparatus of the herein described systems and methods, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the herein described systems and methods. In the case of program code execution on programmable computers, the computing device generally includes a processor, a storage medium readable by the processor (including volatile and non-volatile memory and/or storage elements), at least one input device, and at least one output device. One or more programs that may implement or utilize the synchronization services and/or processes of the herein described systems and methods, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the herein described systems and methods may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the herein described systems and methods. When implemented on a general-purpose processor, the program code combines with the processor to provide a unique apparatus that operates to invoke the functionality of the herein described systems and methods. Additionally, any storage techniques used in connection with the herein described systems and methods may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term “article of manufacture” (or alternatively, “computer program product”) where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Figure 15:
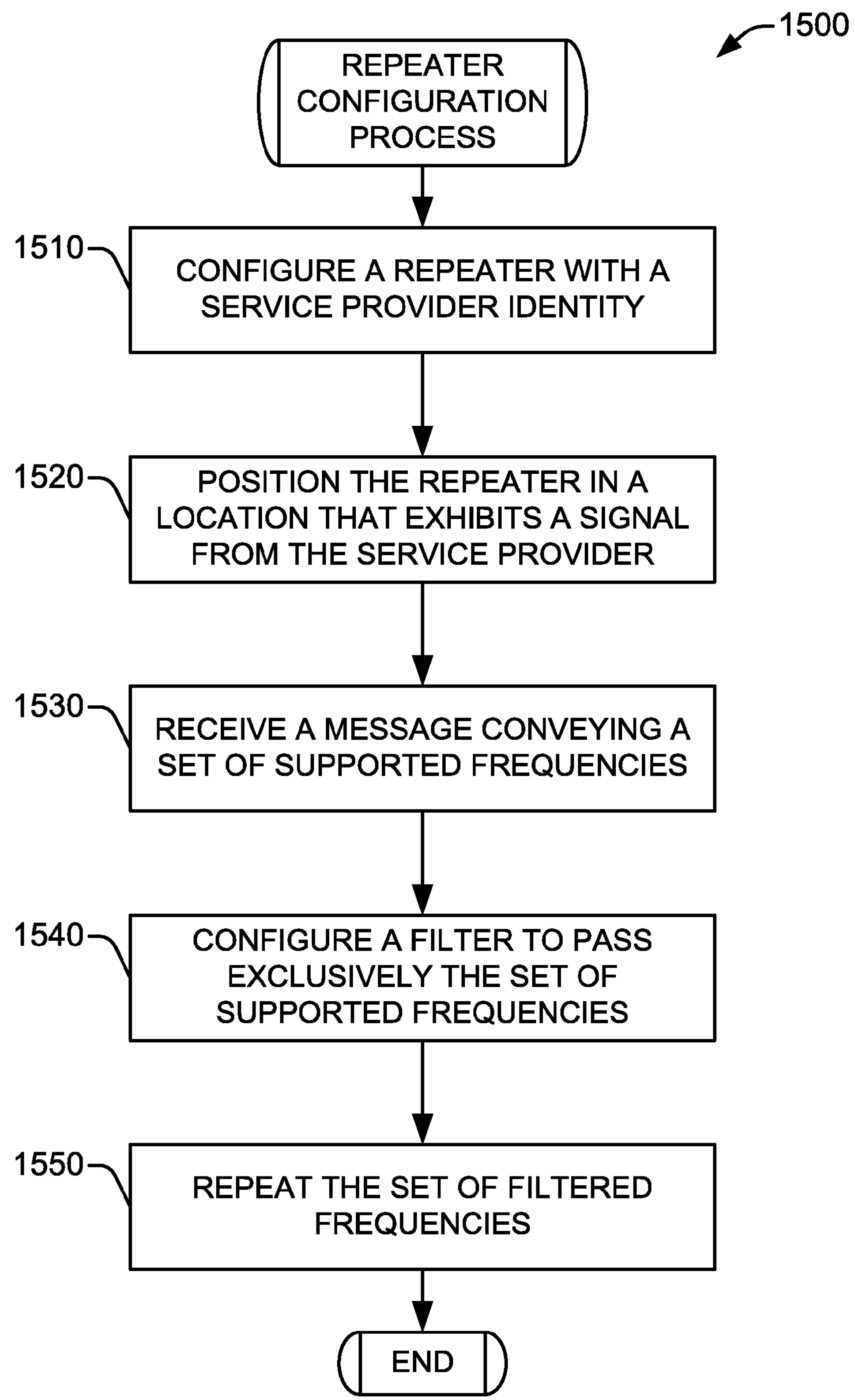
FIG. 15 is a flowchart of an example method to configure a frequency repeater according to aspects described in the subject specification.
Figure 16:
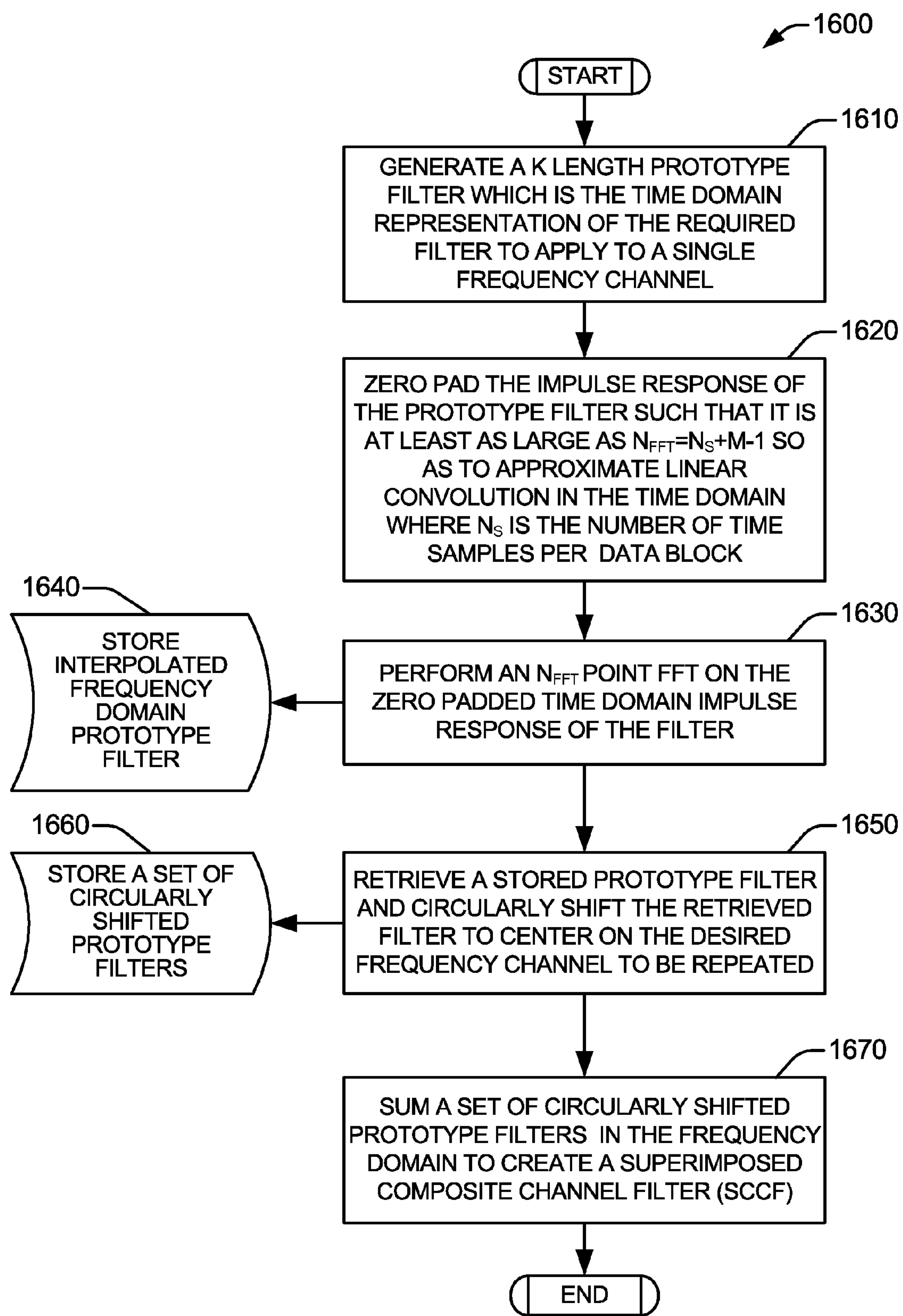
FIG. 16 is a flowchart of an example method for generating a prototype set of digital filter coefficients.
Figure 17:
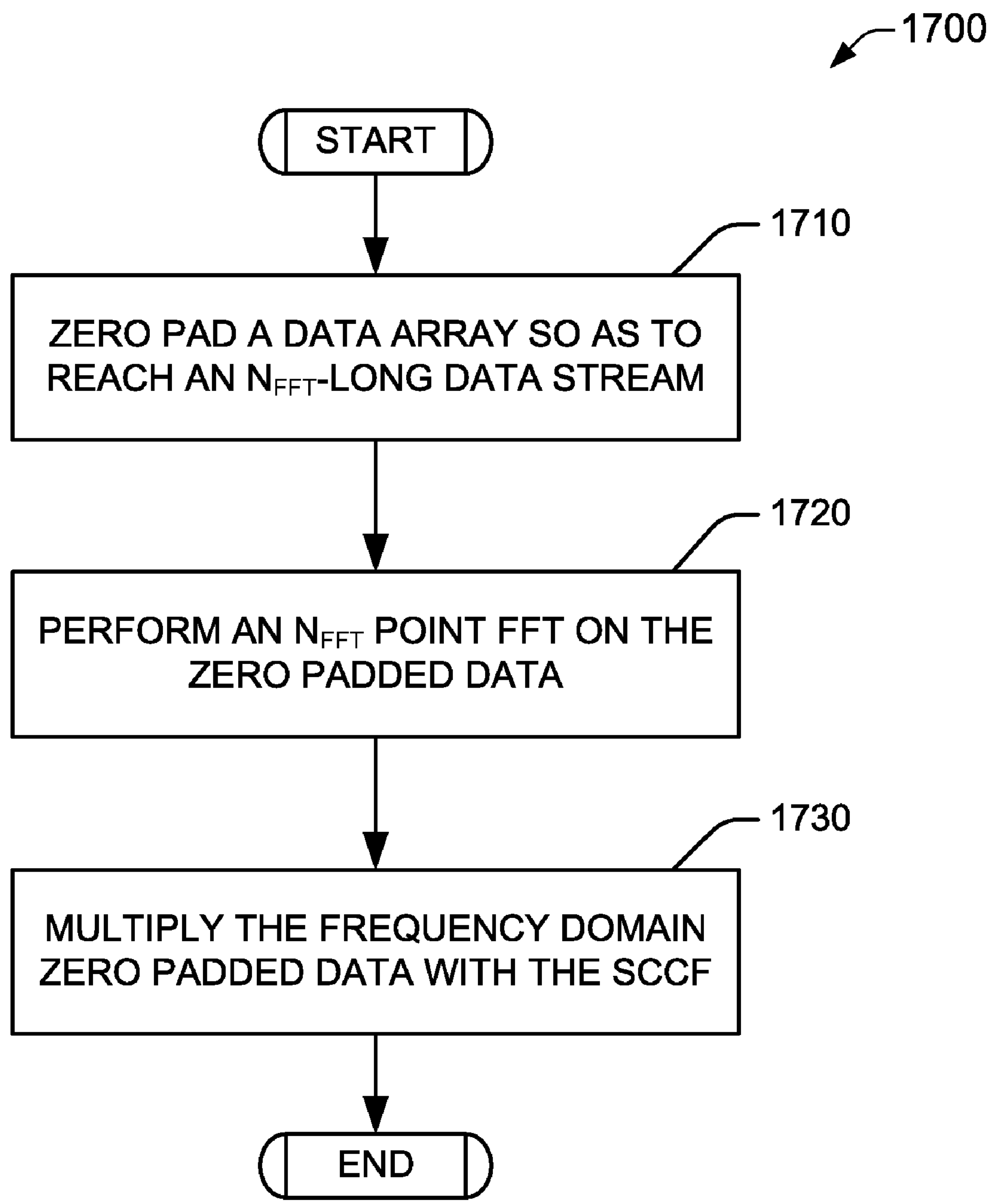
FIG. 17 is a flowchart of an example method for filtering a data stream.

In view of the exemplary systems described supra, methodologies that may be implemented in accordance with the disclosed subject matter will be better appreciated with reference to the flowcharts of FIGS. 15, 16, and 17. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

FIG. 15 illustrates an example method to configure a frequency repeater. In an aspect a frequency repeater can be a repeater platform like platform 1040 as described above. At act 1510, a frequency repeater is configured with a service provider's identity. At act 1520, the frequency repeater is positioned in a location wherein the repeater receives a signal transmitted by the service provider matching the preconfigured identity. At act 1530, a message from the preconfigured service provider is received, the message defines a set of frequency channels utilized by, or available for, service. It should be appreciated that message can be conveyed according to the technology utilized for communication; for instance, in a Wi-Fi network, the message can be communicated through a set of management frames, whereas in WCDMA, CDMA, or LTE systems, the message can be conveyed in a broadcast channel. At act 1540, a digital filter is configured to pass exclusively the received set of frequencies. At act 1550, the filtered, or passed, frequencies are repeated.

FIG. 16 is a flowchart of an example method 1600 for generating a prototype set of digital filter coefficients. At act 1610, an M-length time-domain prototype filter is generated. The filter is a time impulse response that corresponds to the time domain representation of the required filter to apply to a single frequency channel. At act 1620, trailing zeros are added (e.g., zero padding is performed) to the impulse response of the prototype filter, such that it is at least as long as $N_{FFT}=N_S+M-1$, so as to approximate linear convolution with circular convolution in the time domain where $N_S$ is the number of time samples per data block. At act 1630, a $N_{FFT}$ point FFT on the zero padded time domain impulse response of the filter is performed. At act 1640, the interpolated frequency domain prototype filter is stored. At 1650 a stored prototype filter is retrieved and circularly shifted to center on the desired frequency channel to be repeated. At 1660, a set of circularly shifted filters is stored. At 1670, a set of circularly shifted filters are summed to generate a Superimposed Composite Channel Filter (SCCF).

FIG. 17 is a flowchart of an example method 1700 for filtering an input signal, or data stream. At 1710, a data sample, or array, is padded with zeros so as to reach an array length equal to $N_{FFT}$ (see above). At 1720, an $N_{FFT}$ Point FFT on the Zero padded data is performed. At 1730, Multiply the Frequency Domain Zero Padded Data with the SCCF.

Figure 18:
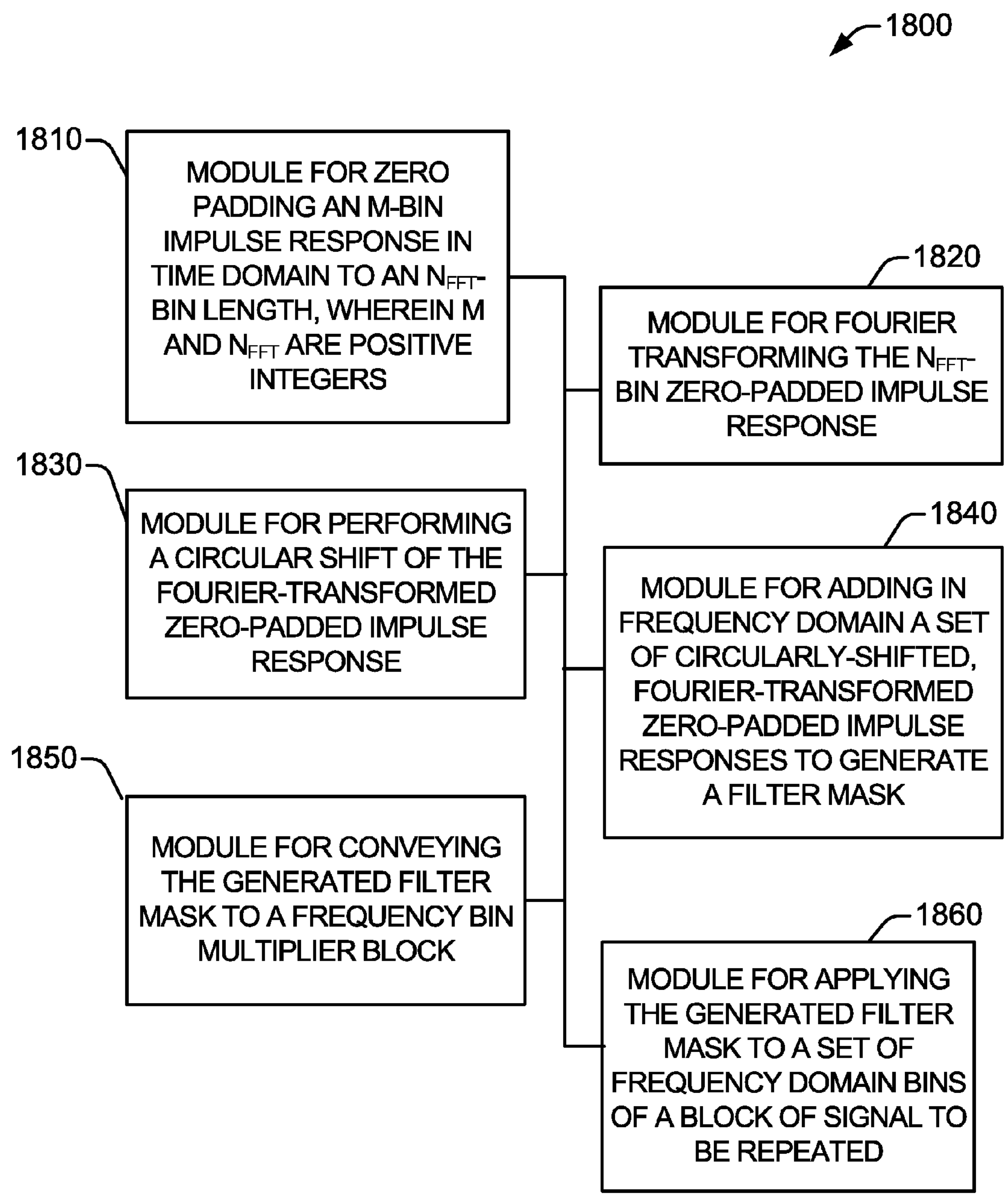
FIG. 18 illustrates an example system that facilitates configuration of a frequency repeater.

FIG. 18 illustrates an example system 1800 that facilitates configuration of a frequency repeater. The system includes a module 1810 for zero padding an M-bin impulse response in time domain to an $N_{FFT}$-bin length, wherein M and $N_{FFT}$ are positive integers; a module 1820 for Fourier transforming the M-bin zero-padded impulse response; a module 1830 for performing a circular shift of the Fourier-transformed zero-padded impulse response; a module 1840 for adding in frequency domain a set of circularly-shifted, Fourier-transformed zero-padded impulse responses to generate a filter mask; a module 1850 for conveying the generated filter mask to a frequency bin multiplier block; and a module 1860 for applying the generated filter mask to a set of frequency domain bins of a block of zero padded to $N_{FFT}$ length data signal to be repeated.

It is to be noted that a module as described herein can comprise hardware, software, or a combination thereof. That is, the structure for modules described herein may be software stored in machine readable media, hardware, or a combination of hardware and software.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the herein described systems and methods has been described in connection with the preferred embodiments of the various figures, it is to be understood that other similar embodiments may be used or modifications and additions may be made to the described embodiment for performing the same function of the herein described systems and methods without deviating therefrom. For example, while exemplary network environments of the herein described systems and methods are described in the context of a networked environment, such as a peer to peer networked environment, one skilled in the art will recognize that the herein described systems and methods are not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the herein described systems and methods in the context of particular programming language constructs, the herein described systems and methods are not so limited, but rather may be implemented in any language to provide methods for representing and exchanging knowledge for a set of nodes in accordance with the herein described systems and methods. Still further, the herein described systems and methods may be implemented in or across a plurality of processing chips or devices, and storage may similarly be effected across a plurality of devices. Therefore, the herein described systems and methods should not be limited to any single embodiment, but rather should be construed in breadth and scope in accordance with the appended claims.

What is claimed is:

1. A method for generating digital filter coefficients utilized in a wireless environment, the method comprising:

appending zeros to an M-sample impulse response in time domain to create a zero padded impulse response of $N_{FFT}$ in length, wherein M and $N_{FFT}$ are positive integers;

Fourier transforming the $_{NFFT}$ length zero-padded impulse response; performing a circular shift of the Fourier-transformed zero-padded impulse response; and adding in frequency domain a set of circularly-shifted, Fourier-transformed zero-padded impulse responses to generate a set of composite digital filter coefficients.

2. The method of claim 1, further comprising:

adding in frequency domain a set of circularly-shifted, Fourier-transformed zero-padded impulse responses to generate composite digital filter coefficients; and performing an inverse Fourier transform of the frequency domain composite digital filter coefficients to obtain a composite time domain digital filter impulse response.

3. The method of claim 1, further comprising conveying the generated filter coefficients to a frequency bin multiplier block.

4. The method of claim 3, further comprising applying the generated digital filter coefficients to a set of frequency domain bins of a block of signal to be repeated.

5. The method of claim 4, generating a set of frequency domain bins of a block of signal by appending $N_S$ time domain signal samples with zeros to form a $N_{FFT}$ block of zero padded time samples, wherein $N_S$ and $N_{FFT}$ are a positive integers;

and, performing a Fourier transform of the zero padded time sample to produce a set of frequency domain bins.

6. The method of claim 5, wherein $N_{FFT}$ is equal to or greater than $M+N_S-1$.

7. The method of claim 4, wherein the generated composite digital filter coefficients are designed to filter a predetermined set of frequencies to be repeated.

8. The method of claim 7, wherein in the M-sample impulse response is designed to match at least one industry standardized waveform property.

9. The method of claim 8, the set of frequencies to be repeated comprising a set of sub-bands within an operating band of a service provider.

10. The method of claim 8, the set of frequencies to be repeated comprising a set of predetermined frequencies associated with the service provider.

11. The method of claim 10, the message is at least one of a broadcast channel or a management frame, or a directed message, or an short message service message.

12. The method of claim 7, wherein the set of frequencies to be repeated is determined by carrying out the following acts:

receiving a message carrying an indication of the set of frequencies;

extracting the set of frequencies from the indication within the message.

13. The method of claim 12, the cell search is conducted by a modem residing in a repeater.

14. The method of claim 13, wherein the predetermined set of frequencies is stored in the frequency repeater.

15. The method of claim 7, the set of frequencies to be repeated is acquired in a cell search of the cellular signals.

16. The method of claim 3, further comprising storing the generated filter mask in a repeater.

17. The method of claim 1, further comprising generating the M-bin impulse response in time domain.

18. A wireless device comprising:

a processor configured to generate an M sample impulse response in time domain, to perform an array padding operation, wherein M is a positive integer; to compute a Fourier transformation of at least one of the M-bin impulse response or an $N_{FFT}$-bin frequency sequence, wherein $N_{FFT}$ is a positive integer; perform a circular shift of an $N_{FFT}$-bin Fourier transformed impulse response; to add a set of Fourier transformed zero-padded impulse responses; to generate a composite mask filter utilizing the added Fourier-transformed impulse responses; and a memory coupled to the processor.

19. The device of claim 18, the processor further configured to convey the generated filter mask to a frequency bin multiplier block.

20. The device of claim 19, the processor further configured to apply the generated filter mask to a set of frequency domain bins of a block of signal to be repeated.

21. The device of claim 20, the block of signal to be repeated comprises a set of sub-bands within an operating band of a service provider.

22. The device of claim 21, the set of sub-bands comprising a set of predetermined frequencies associated with the service provider.

23. The device of claim 21, wherein the set of sub-bands is determined by carrying out the following acts:

receiving a message carrying an indication of the set of frequencies;

extracting the set of frequencies from the indication within the message.

24. The device of claim 18, the processor further configured to store the generated composite set of filter coefficients.

25. An apparatus that operates in a wireless environment, the apparatus comprising:

means for zero padding an M-bin impulse response in time domain to an $N_{FFT}$-bin length, wherein M and $N_{FFT}$ are positive integers;

means for Fourier transforming the $N_{FFT}$-bin zero-padded impulse response;

performing a circular shift of the Fourier-transformed zero-padded impulse response;

means for adding in frequency domain a set of circularly-shifted, Fourier-transformed zero-padded impulse responses to generate a filter mask;

means for conveying the generated filter mask to a frequency bin multiplier block; and means for applying the generated filter mask to a set of frequency domain bins of a block of signal to be repeated.

26. A computer-readable storage medium, volatile or non-volatile, encoded with a computer program, the computer program including:

code for causing a computer to pad an M-bin impulse response in time domain to an $N_{FFT}$-bin length, wherein M and $N_{FFT}$ are positive integers;

code for causing a computer to Fourier transform the $N_{FFT}$-bin zero-padded impulse response;

code for causing a computer to perform a circular shift of the Fourier-transformed zero-padded impulse response; and code for causing a computer to add in frequency domain a set of circularly-shifted, Fourier-transformed zero-padded impulse responses to generate a filter mask; and code for causing a computer to apply the generated filter mask to a set of frequency domain bins of a block of signal to be repeated.

* * * * *